United States Patent
Nguyen

(10) Patent No.: US 11,930,835 B1
(45) Date of Patent: Mar. 19, 2024

(54) SYSTEM FOR MANUFACTURING FOODS WITH PROBIOTICS AND METHOD FOR PREPARING THE SAME

(71) Applicant: VINAMIT USA LLC, Tigard, OR (US)

(72) Inventor: Vien Lam Nguyen, Ho Chi Minh (VN)

(73) Assignee: VINAMIT JSC., Binh Duong (VN)

( * ) Notice: Subject to any disclaimer, the term of this patent is extended or adjusted under 35 U.S.C. 154(b) by 0 days.

(21) Appl. No.: 17/935,571

(22) Filed: Sep. 26, 2022

(51) Int. Cl.
*A23L 33/135* (2016.01)
*F26B 5/06* (2006.01)
*F26B 21/10* (2006.01)
*F26B 21/12* (2006.01)

(52) U.S. Cl.
CPC ............ *A23L 33/135* (2016.08); *F26B 5/065* (2013.01); *F26B 21/10* (2013.01); *F26B 21/12* (2013.01)

(58) Field of Classification Search
CPC ........ A23L 33/135; F26B 5/065; F26B 21/10; F26B 21/12
USPC ........................................................... 426/61
See application file for complete search history.

(56) References Cited

U.S. PATENT DOCUMENTS

2012/0263826 A1* 10/2012 Fang ...................... A23L 33/19
426/61

* cited by examiner

*Primary Examiner* — Hamid R Badr

(57) ABSTRACT

A system and methods of isolating probiotics and adding probiotics into matrices are disclosed, comprising: (a) selecting and preparing a food source by a predetermined quality guideline; (b) obtaining probiotics from the food source using a multi-purpose apparatus operable to function as either a centrifugal machine, a food mixer, and a fermentator; (c) screen testing the probiotics for viability and performances; (d) if the probiotics meet predetermined requirements for viability and performance standards, then record the predetermined quality guideline of said food source and parametric settings of said multi-purposed apparatus into a database for said food source; and (e) otherwise, repeating steps (a) to (c) until the probiotics meet the predetermined requirements for viability and performance standards.

9 Claims, 8 Drawing Sheets

SYSTEM FOR MANUFACTURING FOODS WITH PROBIOTICS AND METHOD FOR PREPARING THE SAME

FIELD OF THE INVENTION

The present invention relates generally to the method and system for food production. More particularly, this invention relates to the method and system for the isolation of new probiotic species and for probiotiazation of food products.

BACKGROUND ART

In the early 1990s, in his book "*The Prolongation of Life*", Elie Metchnikoff (1845-1916) reported the benefits of consuming micro-organism called probiotics after carefully documenting the exceptionally long healthy lives of Bulgarians who regularly consumed soured or fermented dairy products. Since then the use of probiotics in developing functional foods has gained a wide popularity in the world mainly due to the interest in gaining health benefits through consumption of probiotic fortified food products. [1]

The human gastrointestinal tract contains trillions of microorganisms, consisting of up to 1,000 or more different bacterial species, collectively known as the gut microbiota. The gut microbiota plays an important role in the host health, influencing the maturation of the immune system and regulating energy metabolism [2-11]. In general, the intake of probiotics contributes to the enhancement and maintenance of well-balanced intestinal microbiota. Many evidences support the use of these probiotics in preventing and treating diseases and health disorders such as high blood pressure, serum cholesterol, lactose intolerance and many gastrointestinal disorders (irritable bowel syndrome, Crohn's disease, peptic ulcers, antibiotic associated diarrhea, etc.) [13-14]. Probiotics also possess anti-carcinogenic effects and enhance the immune system [15, 16].

The most common probiotic genera have been used are the lactic acid bacteria (LAB) *Bifidobacterium* and *Lactobacillus*. *Lactobacillus* is a genus of friendly bacteria that produces lactic acid and makes up many of the 400 probiotic species found in the human body. Lactobacilli have a number of advantages, including: Increasing mineral bioavailability and inducing growth factors, reducing intestinal permeability by stabilizing the mucosal barrier, producing lactic acid and hydrogen peroxide. These advantages help bacteria maintain a healthy equilibrium in number that produces immunomodulating properties such as improving immunological function and keeping the *Candida albicans* levels at healthy levels. *Bifidobacterium*, like the *Lactobacillus* species, colonizes the human colon and produces lactic acid. These probiotics are beneficial bacteria that help to form a microbial barrier in the intestine against harmful bacteria. In reality, several Bifidobacteria species such as *Bifidobacterium infantis, Bifidobacterium breve*, and *Bifidobacterium longum* adhere to the intestinal mucosa and prevent unwanted bacteria from attaching [12].

Few other microorganisms—mainly bacteria and some yeast—have also been used as probiotics. However, there are some concerns regarding the safety of some probiotic genera such as *Enterococcus*, since they can be pathogenic, causing illness to the host. For probiotic bacteria in foods to be beneficial in the host, they should be able to survive gastric transit and reach the small intestine in sufficient numbers to be effective. Hence, in order to provide health benefits to the host, probiotics should maintain minimum therapeutic level/minimum viability level (106-107 cfu/mL or g of carrier food product) at the time of consumption, possess the ability to tolerate harsh gastric and intestinal conditions (including acid, bile and enzymes) and be able to attach to the gut epithelium. A potentially successful probiotic strain is expected to have several more desirable properties (Table 3) and these characteristics may influence its potential for the commercial applications.

Although research has made great strides, there are many challenges that must be addressed when deciding to probiotize a food product. For example, a consumer who buys a food with probiotics, rightly, expects that food maintains its characteristics unchanged throughout the shelf life; this includes that the microorganisms must remain viable during this period. Different aspects have to be considered: the characteristics of the food matrix, the effects of storage conditions of foods on the microorganisms, and the choice of microbial strains to be used in different foodstuffs. The choice of the probiotic strain is a crucial step. The pH value seems to be a critical factor in the stability of probiotic strains during storage; *L. acidophilus* cultures are generally more resistant to acid environments than bifidobacteria. Moreover, it is also necessary to take into account the fact that a microorganism capable of withstanding the acid pH of a food may not be able to resist the acid pH of the stomach. In fact, the two aspects are not always correlated. For example, some microorganisms, such as *L. lactis, S. thermophilus*, and *L. mesenteroides*, grow well in foods with acidic pH, but are not able to grow in the gastrointestinal tract, thus losing their function of probiotics. Also, the time of exposure to low pH is an important aspect. A strain able to resist the acid pH of the stomach may not be able to resist the acid pH of the product during the storage period. At the moment, it is not well known if there is a link between the ability to survive short time exposures to high-acid environment and the ability to survive long term in fermented products.

Dairy products such as yogurts, fermented sour milk and cheese are at the forefront of probiotic food development at present. Although fermented dairy foods can be considered as one of the most common as well as the traditional modes of delivering of probiotics to humans, at present, many non-dairy as well as non-traditional and convenient probiotic products, such as capsules, have been developed and commercialized in many countries. Soy products, cereal based products, fruit and vegetable juices, and fermented meat and fish products can be considered as main non-dairy probiotic foods available in the market at present. There are many different types and brands of non-dairy probiotic foods as well. Many studies have clearly indicated that the type of carrier foods could affect not only the viability of probiotics during processing and storage, but also on their functional properties, such as susceptibility to adverse conditions in the gut (acidity, bile, and various enzymes), capacity to adhere to gut epithelium and immunomodulation. The incorporation of probiotics into dairy foods may aid in tolerating harsh gastrointestinal conditions better than that of non-dairy carrier foods, as the buffering action of milk as well milk fat, might protect probiotics in such conditions by reducing their direct exposure to harsh conditions. Dairy foods rich in milk fat, such as ice cream, were found to be more effective in enhancing the survivability and bile acid tolerance of probiotics. However, the physical structure of non-dairy probiotic carrier foods such as vegetables for example jackfruit and pineapples might provide a protective environment for probiotics and reduce their exposure to harsh gastrointestinal conditions as well.

There are many different approaches to safely deliver probiotics to the human digestive system. The most common method is through milk products such as milk, milk curds (Chlana), yogurt, ice cream, and cheese. However, this method does not help consumers with lactose deficits. Another method is to use probiotic microencapsulation which uses polymers to improve the physical and mechanical stability of probiotics. However, this method is complex, expensive, and not certain to adhere to gut epithelium and immunomodulation.

Furthermore, Recent advances in gut microbiome research have also led to discover the therapeutic potential of novel probiotic candidates beyond the commonly used genera such as LAB. These microorganisms are referred to as next-generation probiotics, and various novel strains are considered to possess next-generation probiotic effects [15]. However, there does not exist a concrete and repeatable method and a system that can isolate and use the next-generation probiotics that add synergic health benefits to humans.

Therefore, what are needed are an efficient method and a system that can add probiotics to food products at the industrial scale.

What is needed is a system and method that can preserve the viability of probiotic foods at the industrial scale.

What is needed is a system and method that can extract various probiotic strains from selected medicinal fruits and vegetables.

What is needed is a system that can provide a precise control mechanism so that probiotic strains can be preserved.

Yet, what is needed is a method and system that can provide specific settings including eutectic temperatures ($T_{eu}$), optimal temperatures ($T_{opt}$), pressures, and cooling rates so that structural collapse of the food matrix can be avoided and the probiotics can be preserved.

Finally, what is needed is a method and system that can probiotize any delicious foods and vegetables of choice so that these delicious foods and vegetables can confer health benefits after consumption including improving health and preventing diseases in addition to delicious tastes.

The method and system disclosed in the present invention solve the above described problems and fulfill long-felt market needs.

SUMMARY OF THE INVENTION

Accordingly, an object of the present invention is to provide system for incorporating probiotics into a food matrix, comprising: a multi-purposed apparatus configured to operate as a centrifugal apparatus, a mixer, and an anaerobic fermentator; a convection current vacuum freeze drying apparatus comprising: a dryer chamber unit comprising a plurality of trays for depositing probiotic extract blocks to be freeze dried; a convection current condenser unit, mechanically connected to the dryer chamber unit, comprising a plurality of first elongate heat exchange tubes, each first elongate heat exchange tubes having fins arranged around an outer circumference of each of the plurality of first elongate heat exchange tubes, wherein the plurality of first elongate heat exchange tubes substantially fill an internal volume of the convection current condenser unit; a refrigerator unit mechanically connected to the convection current condenser unit, operable to provide a cold refrigerant gas to the plurality of first elongate heat exchange tubes; a cooling tower unit mechanically connected to the convection current condenser unit; a primary vacuum pump unit, mechanically connected to the convection current condenser unit and the cooling tower unit, operable to provide a vacuum pressure to the convection current condenser unit; and a heater unit mechanically connected to provide a heat energy to both the dryer chamber unit and the convection current condenser unit; a controller unit; and a database electrically coupled to communicate with the controller unit, wherein the controller unit is electrically coupled to control and receive sensed operational settings from the dryer chamber unit, the convection current condenser unit, the refrigerator unit, the cooling tower unit, the primary vacuum pump unit, and the heater unit, wherein the database is configured to store predetermined operational settings and wherein the controller unit is operable to compare the sensed operational settings and the predetermined operational settings.

Another object of the present invention is to provide a method for isolating probiotics and adding probiotics into matrices are disclosed, comprising: (a) selecting and preparing a food source by a predetermined quality guideline; (b) obtaining probiotics from the food source using a multi-purpose apparatus operable to function as either a centrifugal machine, a food mixer, and a fermentator; (c) screen testing the probiotics for viability and performances; (d) if the probiotics meet predetermined requirements for viability and performance standards, then record the predetermined quality guideline of said food source and parametric settings of said multi-purposed apparatus into a database for said food source; and (e) otherwise, repeating steps (a) to (c) until the probiotics meet the predetermined requirements for viability and performance standards.

Another object of the present invention is to provide a system for incorporating probiotics into a food matrix that includes: a multi-purposed apparatus configured to operate as a centrifugal machine, a mixer, or a fermentator at industrial scale; and a convection current vacuum freeze drying apparatus with a condenser that have a high rate of cooling using heat transfer of natural convection currents between the condenser unit and a plurality of elongate tubes having circumferential fins.

Yet another of the present invention is to provide a multi-purposed apparatus including a plurality of input terminals in communication with a bowl assembly having flights; an output terminal configured to receive the food matrix from the bowl assembly by a rotational force when the bowl assembly is rotated by a gear assembly; a lift motor operable to lift one end of the bowl assembly so that the bowl assembly is inclined at an angle $\Theta$; and a pair of input weirs in communication with the plurality of input terminal and a pair of the output weirs in communication with the output terminal; the bowl assembly includes a hollow body having a first section with a first diameter connected a second section having a second diameter greater than the first diameter; a beach section connected between the first section and said second section, wherein the first section is connected to the plurality of input terminals and the pair of input weirs; and wherein the second section is connected to the pair of output weirs and the output terminal.

Still, another object of the present invention is to achieve a computer software program stored in a non-transitory memory of the PIDC that can fully control the operational parameters of the convection current vacuum freeze drying machine for viable and function probiotics.

Another object of the present invention is to achieve a vacuum freeze drying apparatus and process that are fully automatic, i.e., controlled and observed by a controller unit or computer that can create optimal freeze drying conditions for probiotic extract.

Another object of the present invention is to achieve a vacuum freeze drying apparatus and method that can provide a high rate of cooling using heat transfer of natural convection currents between the condenser unit and a plurality of elongate tubes having circumferential fins.

Furthermore, another object of the present invention is to achieve a vacuum freeze drying apparatus and process that can provide a deep and uniform freezing zone of the same temperature and pressure so that the quality of the probiotic extracts being freeze dried is uniform.

Yet, another object of the present invention is to achieve a vacuum freeze drying apparatus and process that can provide specific settings including temperatures, pressures, and cooling rates for the probiotic extracts so that structural collapse can be avoided.

Finally, another object of the present invention is to achieve a computer software program stored in a non-transitory memory that can perform an optimal convection current vacuum freeze drying process for the probiotic extracts when such computer software program is executed by a controller unit.

These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skills in the art that the present invention may be practiced without these specific details. In other instances, well-known methods, procedures, components, and circuits have not been described in detail so as not to unnecessarily obscure aspects of the present invention.

Figure 1:
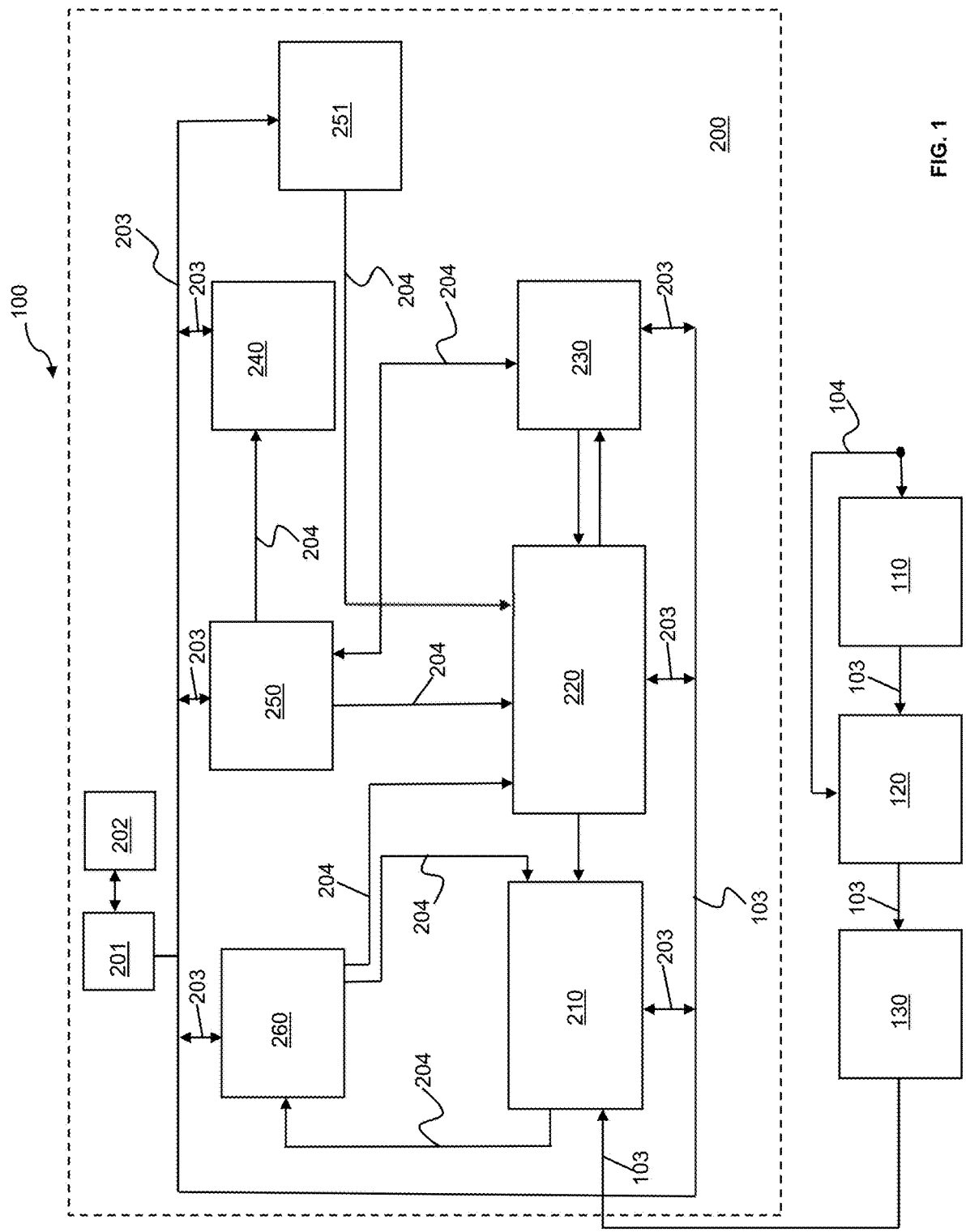
FIG. 1 is a block diagram illustrating a system for preparing and maintaining viable probiotic samples using a convection current vacuum freeze drying apparatus and a multi-purposed decanter centrifuge machine ("centrifermixer") in accordance with an embodiment of the present invention.

One embodiment of the invention is now described with reference to FIG. 1. FIG. 1 illustrates a block diagram of a system 100 for preparing and maintaining viable probiotic foods at industrial scale using a centrifuge decanter and a convection current vacuum freeze drying apparatus. System 100 includes an optional fermentator 110, a multi-purposed sedicanter centrifugal machine 120 (hereinafter referred to as "centrifermixer 120"), a pre-freezing individual quick freezer (IQF) 130, and a convection current vacuum freeze drying apparatus 200. In various embodiments of the present invention, centrifermixer 120 can be conveniently set to function as fermentator 110 that includes a bioreactor or a stirred tank bioreactor (STBR) designed to stir the fermenting mixture at varying speed in rpm throughout the any fermentation period. Some foods and vegetables do not require fermentation to extract probiotics because they are rich with natural probiotics. In situations where fermentator 110 is not required and can be bypassed using a flow path 104, centrifermixer 120 is set or "programmed" to function as a sedicanter centrifugal machine only. In other situations where fermentator 110 is required, centrifermixer 120 is set to function as fermentator 110 without removing the fermented foods. The settings of cetrifermixer 120 as fermentator 110 will be described later.

Continuing with FIG. 1, in many exemplary embodiments of the present invention, convection current vacuum freeze drying apparatus 200 further includes a dryer chamber unit 210, an ice condenser unit 220, a refrigerator unit 230, a cooling tower unit 240, a vacuum pump unit 250, and a water heater unit 260, all connected together by mechanical connectors 103. In various embodiments of the present invention, mechanical connectors 103 are hollow tubes of different shapes and sizes that facilitate the fluid communication between the units. In some embodiments of the present invention, system 100 also includes a controller unit 201 and a database 202. Database 202 is configured to contain specific vacuum freeze drying settings for different probiotic food matrices which have specific vacuum freeze drying settings including triple point temperatures, eutectic temperatures ($T_{eu}$), drying times, freezing rate, pressure, etc. which are studied beforehand and stored in database 202. When a specific probiotic species is selected to be vacuum freeze dried, specific vacuum freeze drying settings stored in database 202 will be loaded into controller unit 201. Afterwards, controller unit 201 uses the specific vacuum freeze drying settings to operate system 100 in accordance with a specific process designed for the specific probiotic species. It is noted that different types of probiotic species and/or strains not mentioned within the present disclosure and their specific vacuum freeze dried settings are also within the scope of the present invention. Yet, in many embodiments of the present invention, mechanical connectors 103 also connect sensing devices such as temperature sensors, pressure sensors, flow meters, timing devices, switches, and valves that can communicate with and be controlled by controller unit 201. The detailed description of these sensing devices and an exemplary embodiment of system 100 will be disclosed in FIG. 2.

In many embodiments of the present invention, convection current ice condenser unit 220 includes a plurality of first elongate heat exchange tubes with fins arranged around the outer circumference of the first elongate heat exchange tubes so that natural convection currents optimize the heat exchange between cold airs from refrigerator unit 230, ice condenser unit 220, and dryer chamber unit 210. As a result, the following objects of the present invention are achieved:

Continuing with FIG. 1, the main feature of the present invention lies in multi-purposed sedicanter centrifugal machine (centrifermixer) 120, convection current ice condenser unit 220, controller unit 201, database 202, and the specific operating process for different probiotic spp. In various embodiments of the present invention, centrifermixer 120 is a modified sedicanter novelly different from the one manufactured by Flottweg. Centrifermixer 120 of the present invention is dynamically set to function as different apparatuses including a sedicanter, a mixer, and a fermentator. More particularly, a hydraulic engine is set at the input end to incline the bowl at angle ⊖ for mixing operation. Multiple input feeds are installed to input different food matrices and other fermenting agents, and input and output weirs can be completely close to keep the food matrices inside. Additionally, centrifermixer 120 also includes a solid bowl centrifuge (decanter centrifuge) that combines the decanter centrifuge technology and disk stack centrifuges. The solid and liquid phases of centrifermixer 120 are separated by centrifugal acceleration. The solid particles, which have a higher density and are hence heavier than the liquid, migrate outwards in the revolving bowl of centrifermixer 120 due to centrifugal force. The sediment forms on the inside of the bowl's inner wall of centrifermixer 120. The separation of solid particles (which contain probiotic species) from liquid is faster and more efficient in a regular centrifuge. The centrifugal force of centrifermixer 120 reaches between 7,000 and 10,000 g. Centrifermixer 120 can process high solis loads such as sugarcanes, apples, coconuts, carrots, etc. in the feed as well as fine and pasty solids such as yogurts, biomass, yeast suspensions, protein suspensions, fermentation broth input from fermentator 110.

In many embodiments of the present invention, convection current ice condenser unit 220 includes a plurality of first elongate heat exchange tubes with fins arranged around the outer circumference of the first elongate heat exchange tubes so that natural convection currents optimize the heat exchange between cold airs from refrigerator unit 230, ice condenser unit 220, and dryer chamber unit 210. As a result, the following objects of the present invention are achieved:

Probiotic foods and vegetables can be produced at industrial scale. In other words, the probiotization of foods and vegetables can be produced at the industrial scale.

A uniformly distributed and constant cold air is created throughout the entire ice condenser unit 220 and dryer chamber unit 210;

The freezing rate can be exactly controlled so that the viability of probiotic spp can be preserved;

Probiotic spp extracts are vacuum freeze dried homogeneously without undesired mutations due to location difference as in conventional vacuum freeze drying systems; and Furthermore, since specific vacuum freeze drying settings for probiotic extract can be learned beforehand and stored in database 202, controller unit 201 can execute the vacuum freeze drying process for different probiotics and food matrices in a precise manner and settings. As such, additional objects of the present invention are achieved:

The probiotic spp are acclimated to the freeze drying condition, especially when they are combined with the food matrices they are derived from. Consequently, these probiotic spp have high probability to survive the harsh condition of the gastrointestinal tract and the long shelf life. If the vacuum freeze drying is either too slow or too fast, the probiotic species may not survive or may mutate. Equipped with the exact vacuum freeze drying rate, time, and settings and stored them in database 202, controller unit 201 can execute processes encoded in computer programs to preserve the probiotic spp with their original properties. These processes will be described in detail in FIG. 5 and FIG. 6.

Figure 2:
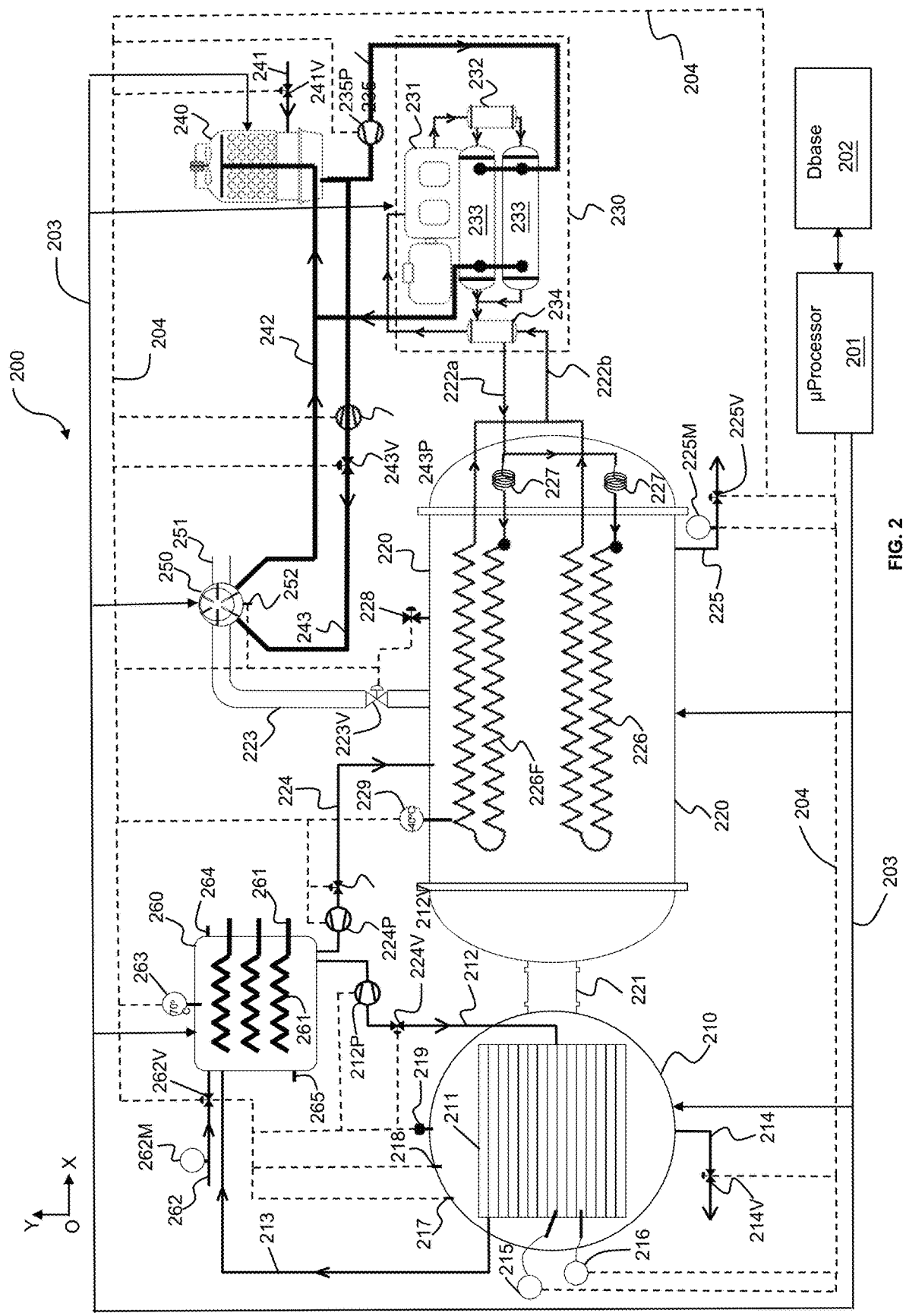
FIG. 2 is a schematic diagram of a convection current vacuum freeze drying apparatus used to preserve viable probiotic samples in accordance with an exemplary embodiment of the present invention.

Now referring to FIG. 2, a schematic diagram of a (natural) convection current vacuum freeze drying apparatus ("CCVFD apparatus") 200 in accordance with an exemplary embodiment of the present invention is illustrated. Convection current vacuum freeze drying apparatus 200 ("CCVFD apparatus 200") includes dryer chamber unit 210, a convection current condensing unit (ice condenser unit) 220, a refrigerator unit 230, a cooling tower unit 240, a vacuum pump unit 250, and a water heater unit 260. In various embodiments of the present invention, apparatus 200 is not a stand-alone device. It is a network-based device that is connected to a controller unit 201 and a database 202 in a network (not shown). The network can be a wide area network (WAN), a local area network (LAN), a wireless sensor network (WSN), Internet of Things (IoT), or a cloud-based network. Furthermore, ice condenser unit 220 includes a plurality of first elongate tubes with fins that accelerate the heat exchange by natural convection currents between the cold temperatures inside ice condenser unit 220 and refrigerator unit 230, providing fast cooling rate and uniformly distributed cold air.

Continuing with FIG. 2, controller unit 201 and database 202 are connected to CCVFD apparatus 200 by mechanical connectors 203. Sensors described below are connected to controller unit 201 by electrical communication channels 204. Electrical communication channels 204 are wireless communication channels such as Wi-fi, Bluetooth, RF, optical, Zigbee, IoT, etc. Mechanical connectors 203 may be wired electrical cables such as data transmission cables RS-232, RS-422, or RS-485, etc. and mechanical connectors such as mechanical connectors 103 including hollow tubes of different shapes and sizes that facilitate the fluid communication between the units. In some embodiments, mechanical connectors 203 may include stainless steel hollow bars.

Controller unit 201 serves as the brain of convection current vacuum freeze drying apparatus 200. In some exemplary embodiments, controller unit 201 is a −16 or −32 bit Programmable Logic Controller (PLC), a Supervisory Control and Data Acquisition (SCADA), or any other type of programmable logic array (PLA) consisting of a memory chip and integrated circuits for control logic, monitoring, and communicating. Controller unit 201 directs the programmable logic controller (PLC) and/or to execute control instructions, communicate with other units, carry out logic and arithmetic operations, and perform internal diagnostics. Controller unit 201 runs memory routines, constantly checking the PLC to avoid programming errors and ensure the memory is undamaged. Memory provides permanent storage to the operating system for database 202 used by controller unit 201. Five programming languages are used in controller unit 201 and PLC. They are defined by the international standard IEC 61131. Ladder logic is one of the most commonly used PLC languages. Another programming language is function block diagram (FBD). It describes functions between input and output variables. The function, represented by blocks, connects input and output variables. FBD is useful in depicting algorithms and logic from interconnected control systems. Structured Text (ST) is a high-level language that uses sentence commands. In ST, programmers can use "if/then/else," "SQRT," or "repeat/until" statements to create programs. Instruction list (IL) is a low-level language with functions and variables defined by a simple list. Program control is done by jump instructions and sub-routines with optional parameters. Sequential Function Chart (SFC) language is a method of programming complex control systems. It uses basic building blocks that run their own sub-routines. Program files are written in other programming languages. SFC divides large and complicated programming tasks into smaller and more manageable tasks.

Dryer chamber unit 210 includes trays 211, a hot water pipe 212, a freeze dried chamber-heater hot water valve 212V ("hot water valve 212V"), a freeze dried chamber-heater hot water pump 212P ("hot water pump 212P"), a return water pipe 213, a discharge water pipe 214, a discharge water valve 214V, a first tray temperature transmitter 215, a second tray temperature transmitter 216, a front door switch 217, a rear door switch 218, a vacuum pressure transmitter 219, all connected as shown in FIG. 2. Hot water valve 212V, hot water pump 212P, discharge water valve 214V, first tray temperature transmitter 215, second tray temperature transmitter 216, front door switch 217, rear door switch 218, vacuum pressure transmitter 219 are network devices (e.g., IoT-based) that can communicate with controller unit 201.

Continuing with FIG. 2, convection current condensing unit (ice condenser unit) 220 connects to dryer chamber unit 210 by a large ice condenser and freeze dried chamber connection pipe 221. Ice condenser unit 220 is connected to refrigerator unit 230 via a liquid refrigerant pipe 222a, a gaseous refrigerant pipe 222b, expansion capillary tubes 227; to vacuum pump unit 250 via a vacuum pipe 223, a vacuum isolating valve 223V; to water heater unit 260 via an ice condenser heater hot water pipe 224, an ice condenser heater hot water valve 224V, an ice condenser heater hot water pump 224P, an ice condenser discharge valve 225, an ice condenser discharge flow meter 225M, and an ice condenser discharge valve 225V. Ice condenser unit 220 further includes convection current heat exchanging tubes with fins 226F, convection current heat exchanging tubes without fins 226, a vacuum release valve 228, and an ice condenser temperature transmitter 229. In many embodiments, vacuum isolating valve 223V, ice condenser heater hot water valve 224V, ice condenser heater hot water pump 224P, ice condenser discharge valve 225, ice condenser discharge flow meter 225M, and ice condenser discharge valve 225V, vacuum release valve 228, and ice condenser temperature transmitter 229 are network devices controlled by controller unit 201.

Still referring to FIG. 2, refrigerator unit 230 includes a compressor 231, a refrigerant container 232, a liquid refrigerant heat exchanger 233, a refrigerant heat exchanger 234, a cooling water pipe 235, and a cooling water pump 235P. Cooling water pump 235P is a network device that can be controlled by controller unit 201.

Still referring to FIG. 2, cooling tower unit 240 includes a feed water pipe 241, a feed water valve 241V, a hot water returning pipe 242, a cooling water pipe for vacuum pump unit 243, a cooling water pump for vacuum pump unit 243P, a cooling water valve for vacuum pump unit 243V. Feed water valve 241V, cooling water pipe for vacuum pump unit 243, cooling water pump 243P, and a cooling water valve 243V are network devices which can be controlled and communicated to controller unit 201. Vacuum pump unit 250 includes a vacuum input pipe 251 and a current transformer transmitter which is a network device. Water heater unit (heater) 260, a three-phase heating element 261, a feed water pipe 262, a feed water flow meter 262M, a feed water valve 262V, a heater temperature transmitter 263, a high water level sensor 264, and a low water level sensor 265 which are also network devices. In some embodiment of the present invention, a Hanbell vacuum type PS1302-AC1 with pumping speed of 15700 L/m, power source of 389V at 50 Hz, and ultimate pressure of 0.00075 torr is used.

In operation, apparatus 200 is fully controlled by controller unit 201 as described in details in processes 700 and 800 below. In other words, in various embodiments of the present invention, process 800 including operational steps 801 to 820 are implemented by apparatuses 100 and 200. The detailed description of apparatus 200 is described in an U.S. Pat. No. 10,921,058, entitled "Fully Automatic Convection Current Freeze Drying Method", by the inventor of the present invention (Vien Lam Nguyen), issued on Feb. 16, 2021, which is a continuation application of another U.S. Pat. No. 10,451,346, entitled, "Convection Current Freeze Drying Apparatus and Method of Operating the Same", by the same inventor and issued on Oct. 22, 2019. These patent applications identified above are incorporated here by reference in its entirety to provide continuity of disclosure.

Figure 3:
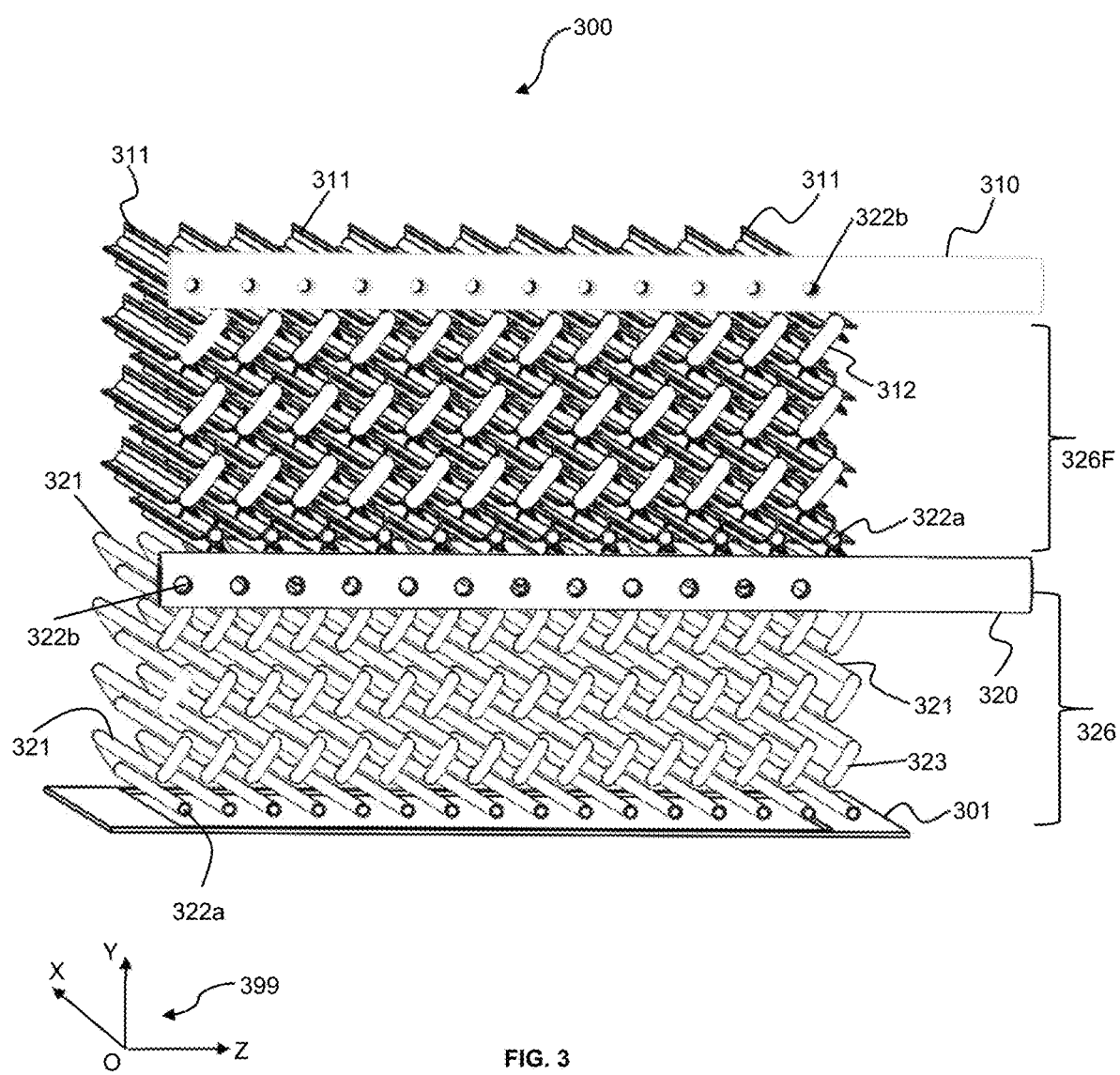
FIG. 3 is a three-dimensional (3D) perspective diagram of the internal structure of the ice condenser unit of the convection current vacuum freeze drying apparatus used to preserve viable probiotic samples in accordance with an exemplary embodiment of the present invention.

Now referring to FIG. 3, a three-dimensional diagram of the internal structure 300 of the convection current condenser unit 220 in accordance with an exemplary embodiment of the present invention is illustrated. Internal structure 300 includes a rectangular base 301 spanning along a horizontal z-direction of a xyz coordinate 399. An array of first elongate heat exchange tubes with fins 326F and an array of second elongate heat exchange tubes without fins 326 are stacked on top of each other and rectangular base 301. Specifically, top array of first elongate heat exchange tubes with fins 326F is a three-dimensional M×N array, where M is the number of first elongate heat exchange tubes with fins 311 along the z-direction and N is the number of first elongate heat exchange tubes with fins 311 along the vertical Y direction. Each first elongate heat exchange tube with fins 311 has a length L spanning along the X direction. In one exemplary embodiment, M is 12, N is 8, and L is 30 mm. In other words, the number of first elongate heat exchange tubes with fins 311 in a row along the Z direction is 12. The number first elongate heat exchange tubes with fins 311 in a column along the Y direction is 8. The length of first elongate heat exchange tubes with fins 311 is 30 mm. Together, the number of first elongate heat exchange tubes with fins 311 in rows Z and in columns Y and their length L form a three-dimensional array 326F.

Continuing with FIG. 3, array of second elongate heat exchange tubes without fins 326 is a three-dimensional M×N array, where M is the number of second elongate heat exchange tubes without fins 321 along the z-direction and N is the number of second elongate heat exchange tubes without fins 321 along the vertical Y direction. Each second elongate heat exchange tube without fins 321 has a length L spanning along the X direction. In one exemplary embodiment, M is 16, N is 8, and L is 30 mm. In other words, the number of second elongate heat exchange tubes without fins 321 in a row along the Z direction is 16. The number of second elongate heat exchange tubes without fins 321 in a column along the Y direction is 8. The length of second elongate heat exchange tubes without fins 321 is 30 mm. Together, the number of second elongate heat exchange tubes without fins 321 in rows Z and in columns Y and their length L form a three-dimensional array 326.

Now referring to FIG. 4, a three-dimensional (3D) perspective diagram of a multi-purposed sedicanter centrifugal machine 400 (hereinafter referred to as "centrifermixer 400") is illustrated in accordance with an exemplary embodiment of the present invention. Centrifermixer 400 includes a conveyor assembly 410, gear box assembly 417 protected by a gearbox guard 401; a bowl assembly 414 and a impeller adjustment assembly 415 protected by an upper casing 402 and a lower casing 404; a food coupling 422 protected by an upper belt guard 403 and lower belt guard 423; and a main drive assembly 421. A centrifuge frame 405 and a subframe 406 are used as a base for conveyor assembly 410. A drive belt 424 couples food coupling 422 and a rear main bearing assembly 416. In many preferred embodiments, main drive assembly 421 is a fully hydraulic drive coaxially connected with bowl assembly 414. That is, the main axis of main drive assembly 421 is the same as that of bowl assembly 414. Main drive assembly 421 is a hydraulic motor separate and positioned away from bowl assembly 414. The characteristic feature of the hydraulic motor is that it rotates together with bowl assembly 414 and which directly powers rear main bearing assembly 416 (or the scroll). Bowl assembly 414 is driven by drive belt 424. In other various embodiments, main drive assembly 421 can be hybrid drive, gear drive with frequency inverter, or backdrive with dual variable frequency drive (VFD). In many embodiments of the present invention, a lift motor 442 is positioned below front main bearing assembly 412 and directly contacted with lower casing 404. In the mixing operation, lift motor 442 lifts up upper casing 402, lower casing 404, and conveyor assembly 410 at an angle $\ominus$.

Figure 4:
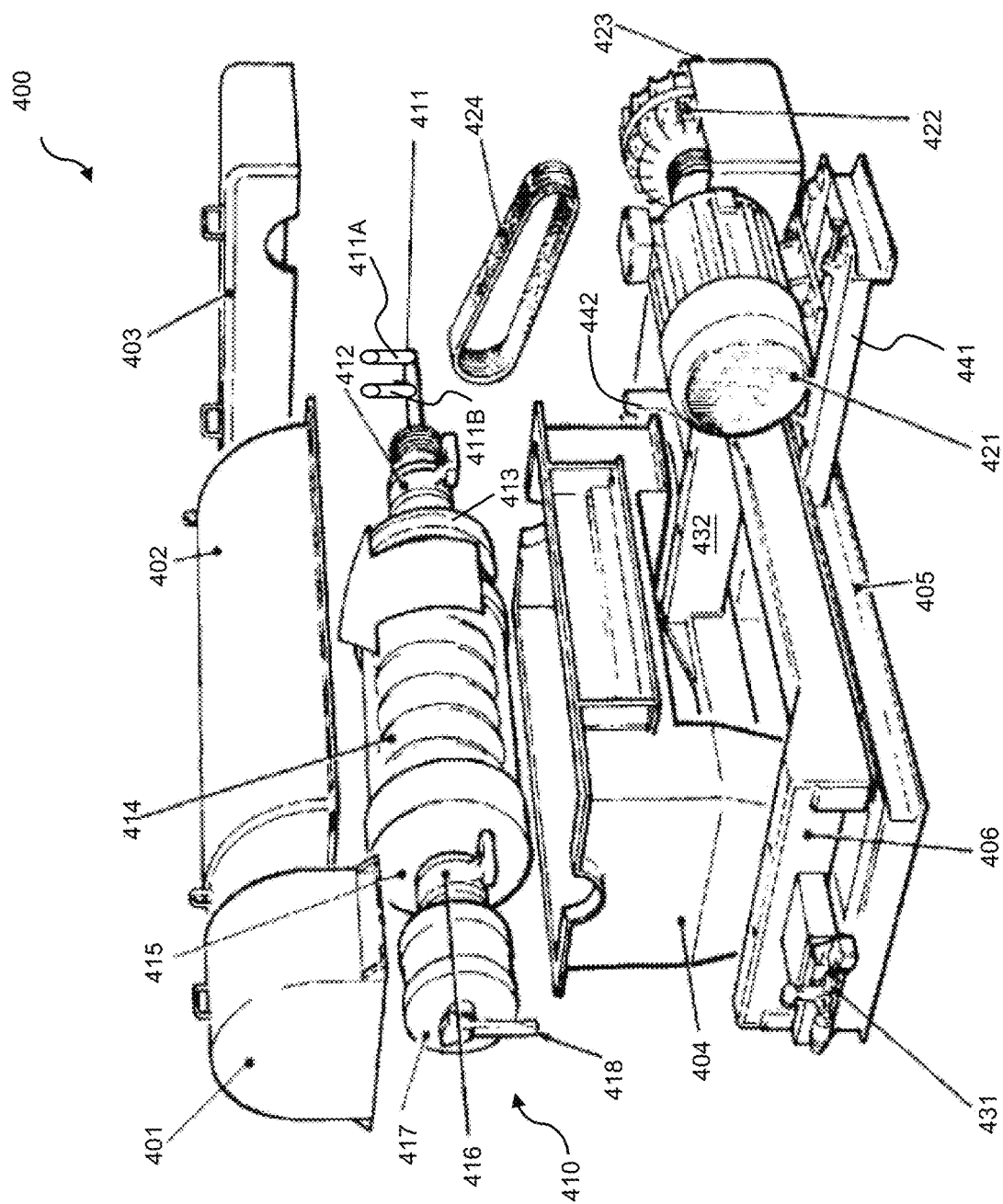
FIG. 4 is a three-dimensional (3D) perspective diagram of a centrifuge machine in accordance with an exemplary embodiment of the present invention.
Figure 5:
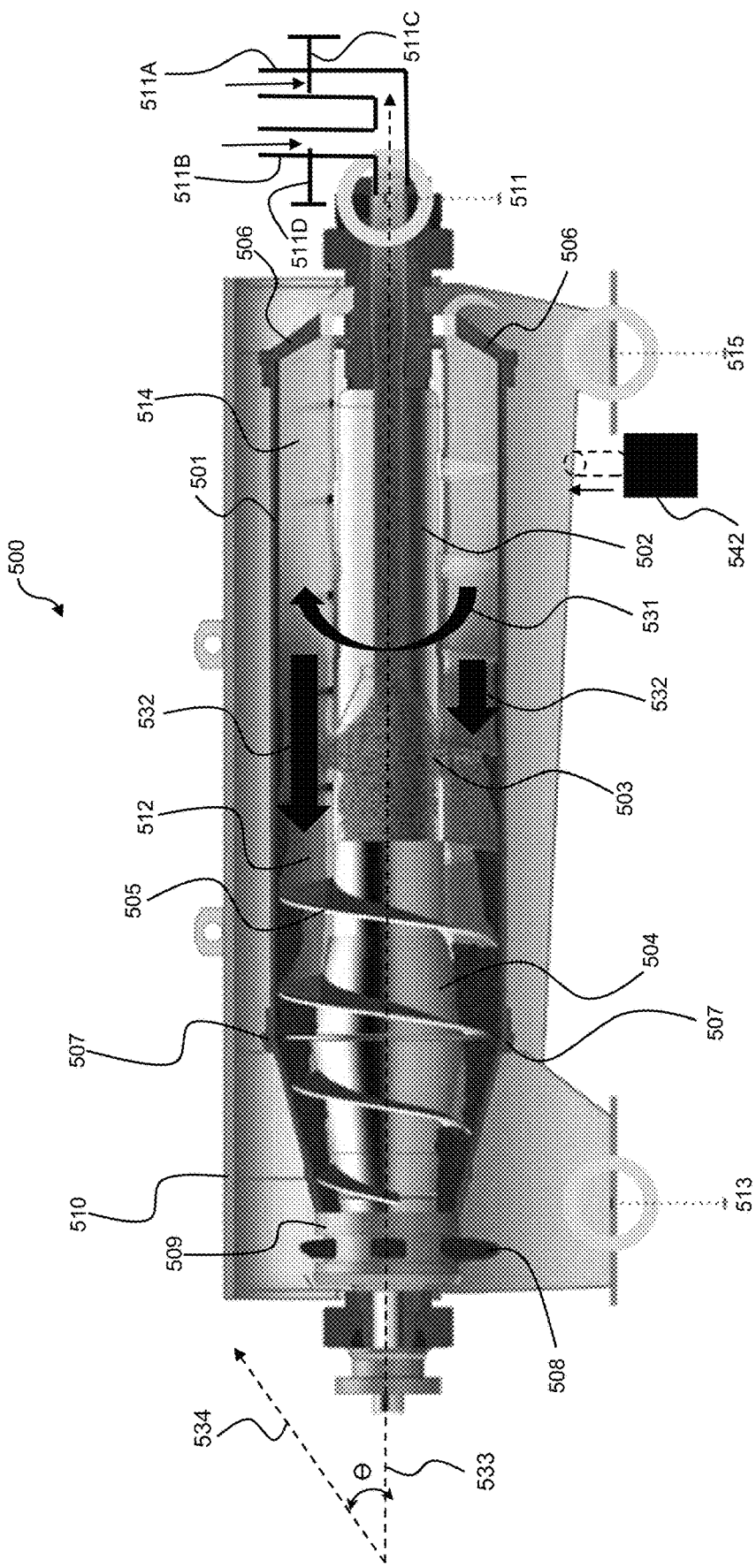
FIG. 5 is a two-dimensional (2D) of a bowl section explaining the operating principle of a decanter in accordance with an exemplary embodiment of the present invention.

Continuing with FIG. 4, the four major component assemblies of centrifermixer 400 are conveyor assembly 410, centrifuge frame 405 and casings 402, 404, together, and main drive assembly 421 and gear box assemblies 417. Conveyor assembly 410 includes impeller adjustment assembly 415, rear main bearing assembly 416, drive belt 424 and total input feed tube 411. These are the most important (and expensive) part of centrifermixer 400, where all the work is done, and which contains the most sophisticated technology, both process and mechanical. These components listed above are heavy weighing up to several tons and producing a force field of ten thousands gravitational force g (g=9.8 m/sec$^2$), a high level of precision engineering is required, followed by precise balancing. In many embodiments of the present invention, the rotational axis of centrifermixer 400 is horizontal. As shown in FIG. 4 and FIG. 5. In some other embodiments, the rotational axis is vertical. The vertical designs are most frequently used for special applications. In addition, the flow of clarified liquid and cake where most of the probiotics reside in centrifermixer 400 is countercurrent. With the countercurrent embodiment, solids and liquid travel in opposite directions, axially, in the separating zone, and discharge at opposite ends. Please refer to FIG. 5. Conveyor assembly 410 is made of either high-grade stainless steel or carbon steel to avoid corrosion.

Referring next to FIG. 5, a two-dimension (2D) diagram of a rotating assembly (screw press) 500 for illustrating the operating principle of centrifermixer 400 in accordance with an exemplary embodiment of the present invention is shown. Rotating assembly 500 of the present invention enables both mixing and separating using rotational forces. As a centrifuge sedicanter, a rotational axis 533 is set to be horizontal, liquid discharge weirs 506, solid discharge weirs 507, and an impeller adjustment assembly 509 are adjusted to clarify the solid cake and the liquids. As a mixer, inclined rotational axis 534 is set at an angle $\ominus$, preferably at 45°, liquid discharge weirs 506, solid discharge weirs 507, and impeller adjustment assembly 509 are closed up during the slow revolution of a bowl assembly 501. Thus, industrial scale mixing and centrifuging of food products are both achieved.

More specifically, rotating assembly 500 includes upper and lower casings 510 designed to protect a bowl assembly 501 which further includes a feedtube 502 and a separation zone 504. Feedtube 502 includes discharge ports 503 for releasing the food matrix into feedtube 502. These active zones including feedtube 502 and separation zone 504 outside of total main input feed 511 are affected by the rotation of flights 505. Feedtube 502 is in food communication with a first input feed 511A controlled by a first input valve 511C and a second input feed 511B controlled by second input valve 511D. When either the first or second input feed 511A or 511B is unused, the respective first input valve 511C or second input valve 511D is closed. When both input feeds 511A and 511B are used for industrial scale mixing and adding probiotics into food matrices, both first input valve 511C and second input valve 511D are opened. The probiotics and food matrix are combined at total main input feed 511. Active zone further includes a solid zone 512 and liquid zone 514. The exit of liquid zone 514 is controlled by liquid discharge weirs 506, whereas the solid discharge is controlled by solid discharge weirs 507. In the mixing operation, liquid discharge weirs 506 and solid discharge weirs 507 are closed up so as to keep the food matrix inside the active zones. On the contrary, in the separation (sedicanting or centrifuge) operation, liquid discharge weirs 506 and solid discharge weirs 507 are partially used to decant the liquid from the solid (centrate or cake). After the separation operation, the liquid is received at the liquid output end 515. The solid is collected at the solid output end 513.

In the industrial mixing mode, the selected fruits and vegetables (food mixture) are inputted to first input feed 511A and the probiotic sp are inputted to second input feed 511B. Rotational axis 534 is inclined at an angle $\ominus$, preferably at 45°, by means of a hydraulic lift motor 542. Both liquid discharge weirs 506 and solid discharge weirs 507 are tightly closed. In the mixing operation, bowl assembly 501 is rotated at slow angular speed in a direction 531. When rotational axis 534 is inclined at the preset angle, there is no centrifuge force that separates the ingredients in the mixture due to the gravitational force mgsin$\ominus$ the pulls the food mixture toward solid output end 513. As a result, the food matrix and the probiotic strains mixed together and received at solid output end 513. The particle size of the mixture is controlled by impeller adjustment assembly 509.

In the industrial centrifuge mode, the selected food matrix is inputted to either first input feed 511A and/or second input feed 511B. Rotational axis 533 is horizontal by lowering hydraulic lift motor 542. Both liquid discharge weirs 506 and solid discharge weirs 507 are partially opened. In the centrifuge operation, bowl assembly 501 is rotated at very high angular speed in a direction 531. The solid part is centrifuged toward direction 532 and received at solid output end 513. The liquid part is pushed toward the input end and escaped through liquid discharge weirs 506 and finally at liquid output end 515.

Thus from FIG. 4 and FIG. 5, the following objects of the present invention are achieved:

(1) different operational modes can be conveniently set to centrifermixer 400 to operate either as (a) centrifuge, (b) mixing, or (c) fermenting at the industrial scale;

(2) cost effective industrial operations due to the three-in-one centrifermixer 400 that eliminates the needs of additional apparatuses such as fermentators and mixers; and (3) industrial scale extraction of probiotic spp is achieved.

Figure 6:
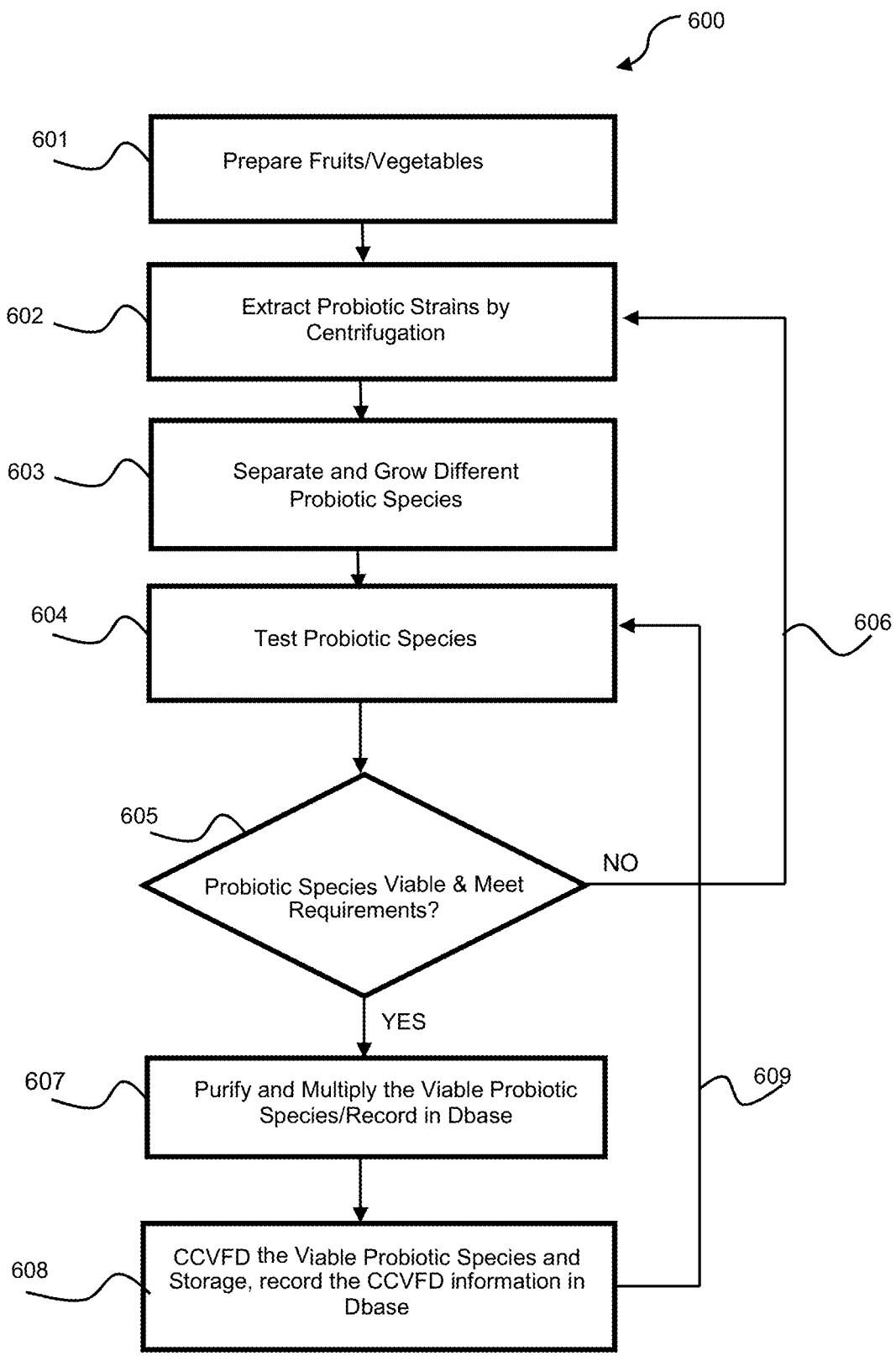
FIG. 6 is a flow chart illustrating a process of extracting probiotics from fruits and vegetables in accordance with an exemplary embodiment of the present invention.

Next refers to FIG. 6, a flow chart of a process 600 of extracting and obtaining new viable probiotic strains (or spp) from selected fruits and vegetables is illustrated. In various embodiments of the present invention, process 600 uses centrifermixer 400 and convection current vacuum freeze drying apparatus 200 described above in FIG. 2, FIG. 4, and FIG. 5 respectively. Briefly, process 600 includes (a) selecting and preparing the fruits and vegetables contain new probiotic strains; (b) extracting the new probiotic strains by centrifuging; (c) growing the obtained new probiotic strains in a laboratory environment; (d) testing each new probiotic species for their functions, performances, and viability; (e) if the new probiotic species meet the requirements, then purifying the probiotic species and record their test procedures, conditions, and results in a database, (f) vacuum freeze drying the new viable probiotic species in a CCVFD system, and (g) repeating step (d) and record the vacuum freezing parameters if the new probiotic species meets the requirements after the CCVFD.

More specifically, at step 601, fruits and vegetables or any food matrix known to have beneficial probiotic strains are selected and prepared. In practice of step 601, fruits and vegetables used in Vietnamese traditional medicine are selected. Other exotic fruits and vegetables are also selected. The medicinal fruits and vegetables naturally contain probiotics and prebiotics include curcumin, garlic, onions, peppers, gingers, chicory, artichokes, leeks, Savoy cabbage, Jack fruits, pineapples, beetroots, durians, kumquats, apples, pennyworts, passion fruits, ambarella, coconut milk or puree, soursop, banana, and pomegranate. These fruits and vegetables are prepared in accordance with predetermined quality guidelines. As a non-limiting example, the predetermined quality guidelines to select only ° BRIX degree of ripeness, fresh without black marks and bruises, shiny color with good shapes, texture, and fresh smell. Ratio of total soluble solids (° Brix) to total number of titratable acidity (%) can also be used by refractometers. Water soluble pectics (WSP) can be used to measure ripeness and softening of the fruits and vegetables. Afterwards, these fruits and vegetables are washed carefully and deseeded if necessary. Some fruits and vegetables may be pasteurized to get rid of harmful bacteria or viruses which are known as pathogens. Examples of pathogens in fruits and vegetables include *Salmonella, E. Coli* 0157:H7 and Hepatitis.

TABLE 1

List of Foods and Vegetables and Their Probiotic Strains

| No. | Products | Probiotics | Preparation Guidelines |
|---|---|---|---|
| 1 | Pineapple (*Ananas comosus*) | *L. casei*; *Pediococcus pentosaceus*; *Lactobacillus rhamnosus*; *Pediococcus pentosaceus* | °BRIX 20-22 Fresh, Mature to ripe, unbruised. pH 6.74-6.76 |
| 2 | Beetroots (*Beta vulgaris*) | *Lactobacillus plantarum* *Lactobacillus rhamnosus* *Lactobacillus delbrueckii* sb. | °BRIX 10-12 |
| 3 | Durian (*Durio zibethinus*) | *Lactobacillus plantarum* | °BRIX 18-20 With stalk, bright green spikes Fresh, unbruised. Mature to ripe pH 6.74-6.76 Musang King |
| 4 | Kumquats (*Fortunella japonica*) | *Lactobacillus bulgaricus* *Lactobacillus acidophilus* *Streptococcus thermophilus* *Bifidobacterium longum* *Bifidobacterium breve* *Bifidobacterium lactis* *Bifidobacterium infantis* *Bifidobacterium adolescentis* *Lactobacillus reuteri* *Bifidobacterium bifidum* | °BRIX 8-10 Fresh, unbruised. Mature to ripe pH 3.0-4.0 |
| 5 | Apples (*Malus domestica*) | *L. acidophilus* *L. rhamnosus* *L. salivarius* *L. plantarum* *L. paracasei* *B. longum* *B. lactis* | °BRIX 14-18 Fresh, unbruised. Mature to ripe pH 6.0 -7.0 |
| 6 | Pennywort (*Centella asiatica*) | *Lactobacillus casei* *Lactobacillus acidophilus* *Bifidobacterium lactis* | °BRIX 11-12 Fresh, unbruised. Mature to ripe pH 6.0-7.0 |
| 7 | Passion Fruits (*Passiflora edulis*) | *Lactobacillus reuteri* | °BRIX 12-18 Fresh, unbruised. Mature to ripe pH 3.0 - 4.0 |
| 8 | Ambarella Fruits (*Spondias Dulcis*) | Need to be fermented. | °BRIX Fresh, unbruised. Mature to ripe pH: 3-4 |
| 9 | Coconut Milk (*Cocos nucifera*) | *Lactobacillus reuteri* | °BRIX 12-14 Fresh pH 6.0-7.0 |
| 10 | Soursop fruits (*Annona muricata*) | Fermented with *Pediococcus pentosaceus* | °BRIX Fresh, unbruised. Mature to ripe pH: 3-4 |
| 11 | Banana (*Musa*) | Prebiotics; may be fermented | °BRIX 12-14 |
| 12 | Mango | *Lactobacillus acidophilus* (La-05) *Lactobacillus plantarum* (LP 299) *Lactobacillus rhamnosus* GG | °BRIX 10-14 Fresh, unbruised. Mature to ripe pH: 6.0- 7.0 |
| 13 | Sugarcane | May needs to be fermented *Lactobacillus reuteri* DDL19 *Lactobacillus alimentarious* DDL 48 *Lactobacillus alimentarius* | °BRIX 12-14 Fresh pH 6.0-7 |
| 14. | Amaranth | *Carnobacterium altaromanticum* | °BRIX 8-10 Fresh, unbruised. Mature to ripe pH 5.0-6.0 |

At step 602, probiotic strains of the prepared fruits and vegetables are separated using a centrifugal machine. In many aspects of the present invention, centrifermixer 400 and 500 described above are used. The clean and selected fruits and vegetables in form of juice or solid chunks are introduced to one of first or second input feeds 511A or 511B. Rotational axis 533 is set horizontally to operate as a sedicanter centrifugal machine. The solids or cakes that contain most of the probiotic strains are collected at solid output end 513 while the bland liquid containing very little or no probiotics is collected at liquid output end 515.

Next, at step 603, the probiotic strains collected from the cake of the fruits are then grown in the laboratory for testing their functions and viabilities. Since these laboratory tests (in vitro tests) are well known in the art, they are not described in details. In some aspects of the present invention, several pheno-, physico- and genotyping methods are used to unambiguously identify probiotic spp. More particularly, the cakes of fruits and vegetables after centrifugal process in step 602 are used to identify specific probiotic species or beneficial microbes living therein using the physiological properties with modern tools such as the API system, BIOLOG GP MicroPlate System. Other rapid identification tools based on genomic features may also be used including 16S rDNA, PCR and quantitative, PCR analysis or proteomic analysis using MALDI-TOF MS tools.

Next, at step 604, each identified probiotic species is tested for their viabilities, functions, and performances. After a specific probiotic species is identified and isolated, different tests are performed to test for their viability, function, and performance. Step 604 achieves the following requirements: (a) the need to prove that the probiotic will do what it is expected; (b) absence of pathogens; (c) cross contamination; and (d) viability or high cell counts. Tests such as probiotic viability is generally determined by quantifying its resistance to simulated gastric juice or to simulated intestinal fluid in in vitro tests, which measure microbial survival after given periods of contact. In this test, the use of a neutralizing agent is needed to avoid a carry-over of gastric or intestinal juice into the culture media of the subsequent analysis and to avoid any antimicrobial effect extended over the defined period of contact of the test. Other tests include diameter of inhibition zone (DIZ) against pathogenic microbes, amino acids, and enzyme components contained in each probiotic species. Step 604 is also known as screening tests for potential use of a probiotic species. Other screening tests are listed in Table 2 below:

TABLE 2

Some Screening Tests for Viability of Novel Probiotic Spp.

| Name Tests | Test Protocols | Requirements |
| --- | --- | --- |
| pH Test, Acid Tolerance | Fresh overnight extracted bacterial cells are harvested by centrifugation and inoculated at 1% (v/v) into MRS broth. The cultures are incubated for 3 hours at 37° C. Thereafter, culture samples are removed at 0 and 3 h, and spread onto MRS agar plates, which are then incubated at 37° C. Survival rate is measured at 0 and 3 h after incubation using colon count procedure. | 90% passing, $10^6$ to $10^8$ CFU/mL |
| Antimicrobial Activities | Fresh over cultures of bacterial isolates were spread onto MRS or BHI agar plates, and 13 antibiogram disks are then carefully placed on the agar plates, which are subsequently incubated at 37° C. for 24 hours. The antibiotic disks consisted of for example, gentacycin (10 µg), cefixime (5 µg, penicillin (10 µg), chloramphenicol (30 µg), erythromycin (15 µg), ampicillin (10 µg), trimethoprim (5 µg) kanamycin (30 µg), vancomycin (30 µg), rifampin (5 µg), azithromycin (15 µg), and clindamycin (2 µg). The results are reported according to the Clinical and Laboratory Standards Institute (CLSI) guidelines | 90% passing, $10^6$ to $10^8$ CFU/mL |
| Gastric & Bile Salts Tolerance | Overnight bacterial cultures are inoculated at 1% (v/v) into both MRS broth media and MRS broth containing 0.3% (w/v) oxgall. They are both incubated for 4 hours at 37° C., and the optical density (OD) of the cultures is measured at 600 nm. Subsequently, the percentage of growth inhibition is determined with the following formula: Inhibition% = (Growth in control − Growth in oxgall/Growth in control) × 100 | 90% passing, $10^6$ to $10^8$ CFU/mL |
| Cell Surface Hydrophobicity | The hydrophobicity of the isolates is measured using the microbial adhesion to hydrocarbons (MATH) method. Briefly, an overnight culture of the isolates is washed twice using PBS, and their optical densities are then adjusted to 0.5 to 0.6 at 600 nm (A0). One millimeter of xylene was added to each suspension and vertexed vigorously for 1 minute. Then the mixture is incubated at 37° C. for 1 h. After incubation and phase separation, the aqueous phase is carefully removed to measure its absorbance (At). Hydrophobicity percentage is calculated with the formula presented below: Hydrophobicity (%) = (1 − At/A0) × 100 | 90% passing, $10^6$ to $10^8$ CFU/mL |

At step 605, after different screening tests have been performed, determining if the probiotic species meets their predetermined requirements. Generally, the requirements include $10^6$ to $10^8$ CFU/mL (colony forming unit) before and after the cited tests in step 604. The passing requirements of step 605 are based on the Requirements in Table 2 above.

At step 606, if probiotic spp do not pass the tests specified in step 605, step 602 to step 604 are repeated to (a) adjust the extraction and testing procedures and/or (b) find other probiotic spp containing in the same selected fruits and vegetables spp that pass the tests in step 605 and are useful in the final food production.

At step 607, if probiotic spp are found viable and functional, these probiotic spp are further purified and multiplied at an industrial scale from the cake collected from step 602 to obtain probiotic bulk (large amount of viable and functional novel probiotic spp). Once high-quality probiotic bulk has been produced, the strains need to be stored for future use. Furthermore, step 602 to step 607 are rigorously documented to ensure the consistent high quality of the novel strains at the industrial scale.

Finally, at step 608, the probiotic bulk spp are lyophilized in a convection current vacuum freeze drying system. Step 608 is realized by the convection current vacuum freeze drying system 200. The setting parameters of system 200 are carefully documented to ensure repeatable quality, functionality, and long shelf life of the novel probiotic species.

At step 609, after the lyophilization process, steps 604 to step 605 are repeated to ensure that the lyophilized probiotic bulks are still viable and meeting functional requirements by repeating step 604 to step 607.

Process 600 is a clinical trial to find novel probiotic spp that provide new health benefits to consumers. The novel probiotic spp are mainly elicited from exotic fruits and vegetables grown in the Southeast Asian jungles and farms. Process 600 uses centrifermixers 400 and 500 that is set to operate as a centrifuge that separates the liquid and the solid cake. Afterwards, a series of clinical tests are performed to obtain viable and function novel probiotic spp. All data and information of a probiotic species are stored in the database.

Method 600 achieves the following objectives:
(a) viable probiotic strains and probiotic foods are produced at the industrial scale; and
(b) precise procedure, conditions, and system parameters are repeated to ensure viable and functional probiotics.

Figure 7:
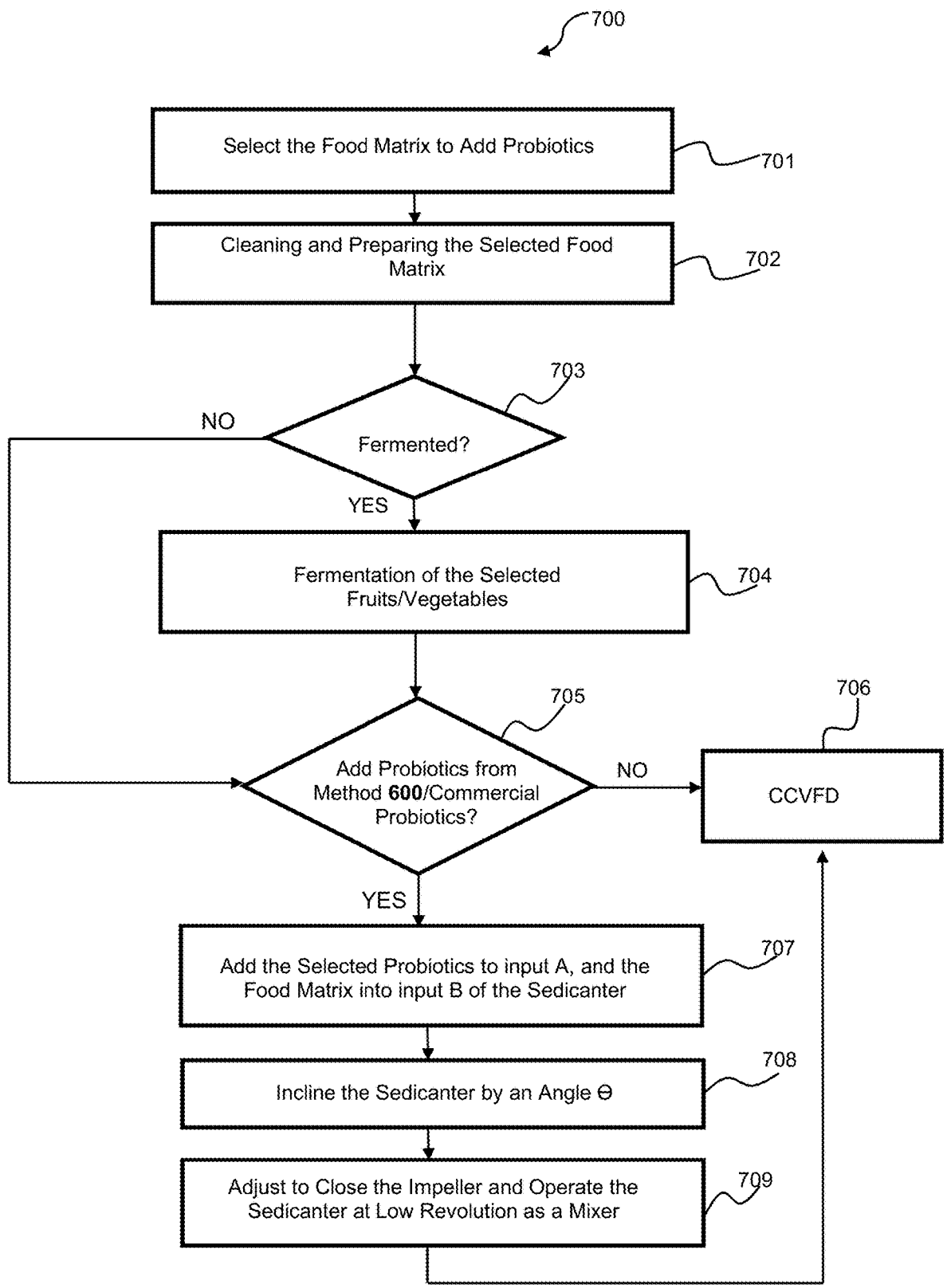
FIG. 7 is a flow chart illustrating a process of preparing food products from fruits and vegetables in accordance with an exemplary embodiment of the present invention.

Next refers to FIG. 7, a process 700 of incorporating novel probiotic spp obtained from process 600 into food matrix in accordance with an aspect of the present invention is illustrated. Process 700 is about adding novel and beneficial probiotics obtained from process 600 into various food matrices. Food matrices may include ready to drink coffee powder, coconut puree, and other delicious and health benefit fruits and vegetables, and/or yogurts. The essence of process 700 is to use the centrifermixers 400 and 500 above set as a mixer to mix the probiotic spp into the food matrix in industrial scale.

At step 701, a food matrix to be added probiotics is selected. Food matrix may be in different forms such as puree, juice, chunks, yogurt, and ready to drink coffee. Probiotics may include novel probiotic spp obtained from process 600 above and/or probiotics obtained commercially such as the lactic acid bacteria (LAB).

At step 702, the selected food matrix is cleaned and prepared as described in step 601 above. In case of fruits and vegetables, the predetermined criteria are described above in step 601 in process 600. In case of ready to drink coffee, the preparation of ready to drink coffee is described in TABLE 1 in a U.S. Pat. No. 11,185,087 entitled "Coffee Extract Powder and Method for Preparing the Same Using a Smart High-Volume Coffee Brewing Machine and a Convection Current Freeze Drying Apparatu" issued on Nov. 30, 2021 by the same inventor. In case of sugarcane juice and other fruit juice, the preparations are fully described in the U.S. Pat. No. 10,676,797 entitled, "Concentrated Sugarcane Juice Powder and Method for Preparing the Same Using the Convection Current Freeze Drying Apparatus" issued on Jun. 9, 2020 by the same inventor of the present invention.

At step 703, whether the selected and prepared food matrix needs to be fermented is determined and decided. For example, if the food matrix is yogurt and fermented foods such as beers, kimchi, banana, etc., then move to step 704, please refer to TABLE 1 above; otherwise forward to step 705.

At step 704, the food matrix is fermented at industrial scale. Step 705 is realized by centrifermixers 400 and 500 described above. In this fermentator configuration, rotational axis 533 is used and set horizontally, liquid discharge weirs 506 and solid discharge weirs 507 are closed up during the mixing operation. The food matrix and the fermenting agents are added into input feeds 511A and 511B respectively. Centrifermixers 400 is set to rotate at very low speed for 2 weeks.

At step 705, whether the fermented food matrix or the non-fermented food matrix need to add novel probiotic spp obtained from process 600 or other commercially available probiotics is determined. If the answer is NO, then the food matrix is vacuum freeze dried using the apparatus 200 described above. If the fermented food matrix does not need to add more probiotics, it is obtained at the solid output end 513. Otherwise, the fermented or non-fermented food matrix is left inside centrifermixer 400. Then the chosen probiotics are added at first input feed 511A or second input feed 511B.

At step 706, if the food matrix does not need to add probiotics, then it is vacuum freeze dried using the apparatus 200 described above.

At step 707, if the food matrix needs to add probiotics, probiotics are added to first input feed 511A or second input feed 511B. First input valve 511C and second input valve 511D are open respectively.

At step 708, centrifermixer is set an angle ⊖. In many aspects of the present invention, the angle ⊖ is 45°. In other aspects, the angle ⊖ and the rotational speed are selected to overcome the centrifugal force created by the rotation of bowl assembly, so that mixing is occurred at the solid output end 513. Consequently, inclined rotational axis 534 of centrifermixer 400 is achieved by virtue of hydraulic lift motor 542.

At step 709, input discharge weirs and output discharge weirs are closed up during the mixing operation. Step 709 is realized by closing input discharge weirs 506 and output discharge weirs 507. After the mixing is accomplished, solid discharge weirs 507 and solid output end 513 are opened to receive the final mixture. Step 706 of the vacuum freeze drying step is repeated to preserve the food matrix mixed with the probiotics.

Figure 8:
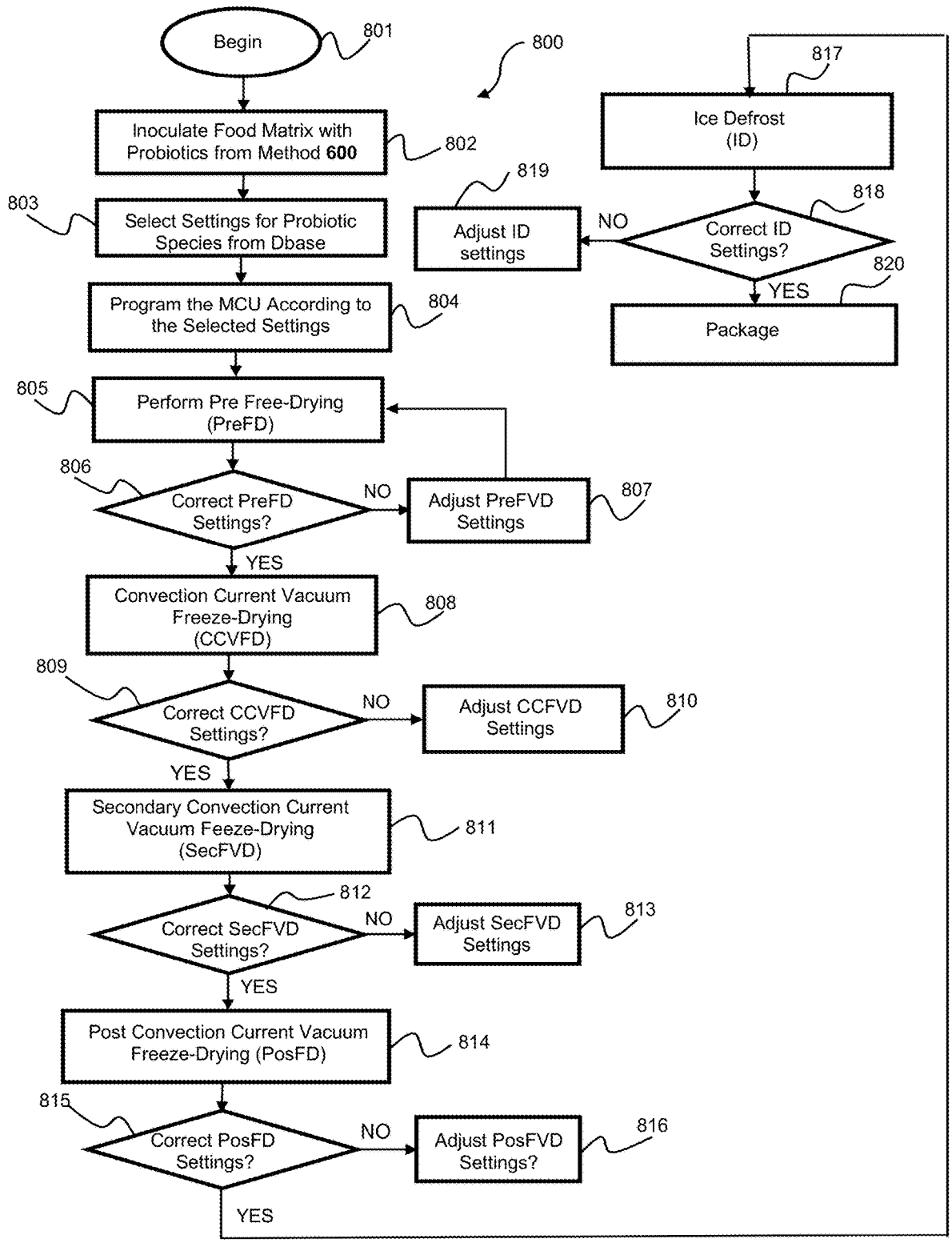
FIG. 8 is a flow chart illustrating a process of adding probiotics into a food matrix in accordance with an exemplary embodiment of the present invention.

Finally, referring to FIG. 8, a flow chart illustrating a method 800 of operating convection current vacuum freeze drying apparatus 200 ("apparatus 200") in accordance with an exemplary embodiment of the present invention is illustrated. The operation of apparatus 200 illustrated by process 800 further includes the following operational steps: performing the preliminary convection current vacuum free drying (pre CCVFD) 801-804, performing the primary convection current vacuum free drying (pri CCVFD) 805-808, performing secondary convection current vacuum free drying (sec CCVFD) 809-812, performing post convection current vacuum free drying (post CCVFD) 813-816, and performing ice defrosting 817-820.

In the pri CCFVD operational steps 801-804, the refrigerator unit 230 is started to collect cold air inside and dryer chamber unit 210 and ice condenser unit 220. Discharge water valve 214V and ice condenser discharge valve 225V are closed. Cooling water pump for vacuum pump unit 243P and cooling water valve 243V are switched off. The water circulation in dryer chamber unit 210 is closed off. At the same time, freeze dried chamber-heater hot water valve 212V is switched on. Fans in cooling tower unit 240 are turned on. Cooling water pump 235P is also turned on to cool compressors 231. After compressor 231 is turned on, the temperatures of a plurality of elongate heat exchange tubes with radially arranged fins 226 are recorded via temperature transmitter (also known as thermometer or thermocouple) 229. Controller unit 201 observes whether the temperature is lowered by 5° C. If it does not, alarm signals are sent out. Controller unit 201 sends diagnostic signals to inspect refrigerator unit 230. If refrigerator unit 230 is normal, trays 211 are loaded with blocks of frozen probiotic extract. In some embodiments of the present invention, conveyors (not shown) will thrust trays 211 loaded with the selected probiotic extract deep inside dryer chamber unit 210.

At step 801, method 800 begins by cleaning and checking all the electrical as well as mechanical connections between the units are correct and secured as described in FIG. 2 above. All valves, e.g., 212V, 214V, 223V, 225V, 228, 243V, 262V, are released to clear all residual water out of the system and ice defrosting step is performed. In other words, step 801 involves all necessary preparatory steps prior to the vacuum freeze drying process begins. In many aspects of the present invention, step 801 may involve calibration procedure to ensure proper and accurate performance of apparatus 200 in accordance with ISO standards such as ISO 13408. The preparatory steps may include temperature tests such as shelves temperatures tests with and without loads, steam in place (SIP) test to ensure proper sterilization of apparatus 200, and tests for vacuum pump unit 250, etc.

At step 802, novel probiotic spp bulk obtained prepared by process 600 and process 700 above to be vacuum freeze dried is selected. The novel probiotic spp are clinically tested for their viability and functions as described in process 600 as described in FIG. 6 above. The frozen viable novel probiotic spp are laid in trays 211. Controller unit 201 and database 202 are informed and programmed to perform the next steps accordingly.

Next, at step 803, specific settings for a specific probiotic species in step 801 are located from a preconfigured database. The preconfigured database is a database built from careful and thorough prior clinical tests for probiotic extracts. As alluded above, clinical tests are performed to obtain specific settings include eutectic temperatures ($T_{eu}$), critical temperatures ($T_C$), triple point or sublimation temperatures ($T_{SUB}$), optimal temperatures ($T_{opt}$), pressures, durations for each phase (t sec), etc. for probiotic extracts. In many aspects of the present invention, step 803 is implemented by database 202. The specific settings for the probiotic extracts are stored in database 202 such as Look-Up Table (LUT); Read and Write memory; CD-ROM; DVD; HD-DVD; Blue-Ray Discs; etc.; semiconductor memory such as RAM, EPROM, EEPROM, etc.; and/or magnetic memory such as hard-disk drive, floppy-disk drive, tape drive, MRAM, etc. A simple exemplary database in accordance with an exemplary embodiment of the present invention is listed in Table 4 below. Please note that Table 4 is only a simplified example of the database of the present invention. In reality, the database can have other settings listed above which are necessary to carry out an optimal convection current freeze drying process for the probiotic extracts.

TABLE 3

A Simplified Example of a Vacuum Freeze Drying Database

| Address | Products | Triple Point Temperatures | Pressures |
|---|---|---|---|
| 1 | Pineapple (*Ananas comosus*) | <−20° C. | <0.5 Torr. |
| 2 | Beetroots (*Beta vulgaris*) | <−20° C. | <0.5 Torr. |
| 3 | Durian (*Durio zibethinus*) | <−18° C. | <0.5 Torr. |
| 4 | Kumquats (*Fortunella japonica*) | <−30° C. | <0.1 Torr. |
| 5 | Apples (*Malus domestica*) | <−30° C. | <0.1 Torr. |
| 6 | Pennywort (*Centella asiatica*) | <−20° C. | <0.2 Torr. |
| 7 | Passion Fruits (*Passiflora edulis*) | <−20° C. | <0.5 Torr. |
| 8 | Ambarella Fruits (*Spondias Dulcis*) | <−20° C. | <0.2 Torr. |
| 9 | Coconut Milk or (*Cocos nucifera*) | <−20° C. | <0.5 Torr. |
| 10 | Soursop fruits (*Annona muricata*) | <−20° C. | <0.5 Torr. |
| 11 | Banana (*Musa*) | <−20° C. | <0.5 Torr. |
| 12 | Jack fruits (*Artocarpus heterophyllus*) | <−20° C. | <0.5 Torr. |
| 13 | Sugarcane juice | <−20° C. | <0.5 Torr. |
| 14 | Amaranth | <−30° C. | 0.4559 Torr. |

Next, at step 804, after all the settings are located in the database, a controller unit is programmed with the above settings. In many exemplary embodiments of the present invention, step 804 is implemented by controller unit 201 which includes, but not limited to, a desktop computer, a laptop computer, a Programmable Logic Controller (PLC), a Supervisory Control and Data Acquisition (SCADA), or any other type of microprocessors or programmable logic array (PLA).

More specifically, in the pri CCFVD operational steps 805-807, the refrigerator unit 230 is started to collect cold air inside and dryer chamber unit 210 and ice condenser unit 220. Discharge water valve 214V and ice condenser discharge valve 225V are closed. Cooling water pump for vacuum pump unit 243P and cooling water valve 243V are switched off. The water circulation in dryer chamber unit 210 is closed off. At the same time, freeze dried chamber-heater hot water valve 212V is switched on. Fans in cooling tower unit 240 are turned on. Cooling water pump 235P is also turned on to cool compressors 231. After compressor 231 is turned on, the temperatures of a plurality of elongate heat exchange tubes with radially arranged fins 226F are recorded via temperature transmitter (also known as thermometer or IoT thermometer) 229. Controller unit 201 observes whether the temperature is lowered by 5° C. If it does not, alarm signals are sent out. Controller unit 201 sends diagnostic signals to inspect refrigerator unit 230. If refrigerator unit 230 is normal, trays 211 are loaded with a bulk of novel probiotic spp listed in Table 1. In some embodiments of the present invention, conveyors (not shown) will thrust trays 211 loaded with the selected probiotic spp inside dryer chamber unit 210.

Continuing with operational steps pre CCVFD 805-807 and FIG. 2, tray temperature transmitters 215 and 216 are moved into position to record tray temperatures during the convection current vacuum freeze drying process. The door(s) of dryer chamber unit 210 are automatically closed by turning on front door switch 217 and rear door switch 218. Sensors will alarm controller unit 201 if doors are not hermetically closed. Cooling water valve 243V and cooling water pump 243P are switched on to cool vacuum pump unit 250. Vacuum isolating valve 223V is tightly switched off so that when vacuum pump unit 250 is turned on it will not be overloaded. Controller unit 201 observes when vacuum pump unit 250 is overloaded. If the vacuum pump is overloaded, controller unit 201 tightens up vacuum isolating valve 223V and checks for overloading again. Some timeouts can be provided to apparatus 200 during correction steps. This correction repeats until vacuum pump unit 250 is not overloaded. When this condition happens, controller unit 201 turns on vacuum pump unit 250 by 5% per minute until vacuum pump unit 250 is fully throttled on. At this time, the pre CCVFD operational steps 805-807 end.

At step 805, a preliminary convection current vacuum free drying step (pre CCVFD) is performed. In the implementation of step 805, all the valves and flow meters are turned off so that all main units 210 to 260 are isolated from one another. First, water heater unit 260 and the vacuum pump unit 250 are turned off because it is not required in the early stages of the process. Meanwhile, ice condenser unit 220, refrigerator unit 230, and cooling tower unit 240 are turned on. Ice condenser unit 220 is slowly set to a temperature less than the initiation temperature of 5° C. Once this initiation temperature is achieved for a first predetermined time duration, the bulk of probiotic spp is loaded either manually or by an automatic conveyor which is controlled by controller unit 201. When all trays 211 in dryer chamber unit 210 are finished loading, vacuum pump unit 250 is turned on. Cooling tower valve 243V and vacuum pump isolating valve 223V are turned off. Next, a second predetermined time duration is set by controller unit 201. Finally, vacuum pump unit 250 is checked for overloading. If vacuum pump unit 250 is overloaded, controller unit 201 will reset the second predetermined time duration until the overloading condition is cleared. Then, vacuum isolating valve 223V connecting vacuum pump unit 250 and ice condenser unit 220 is slowly opened at a predetermined rate of approximately 5% per minute until this vacuum isolation valve 223V is fully opened. Thus, the objective of the pre CCVFD operational step is to set up the initial temperature (less than 5° C.) and slowly turn on vacuum pump unit 250 at a predetermined rate of 5% per minute.

At step 806, the initiation temperature, the first predetermined time duration, the second predetermined time duration, the rate, and other settings of the preliminary convection current vacuum free drying are sensed by sensors and sent to a controller unit. The controller unit compares these observed setting data with those stored in the database and determines whether the preliminary CCVFD is performed correctly. In many embodiments of the present invention, step 806 can be implemented by controller unit 201, database 202, and sensors such as 215, 216, 219, 225M, 229, 252, 262M, 263, 264, etc. which can be observed remotely by devices such as cell phones, laptops, computers, etc. that are connected to the network. In a preferred embodiment, convection current vacuum freeze drying apparatus 200 of the present invention is network-based. In some embodiments, convection current vacuum freeze drying apparatus 200 of the present invention is a stand-alone machine which is not connected to any network.

At step 807, the settings of the preliminary CCVFD are sensed by the sensors. Similar to step 806, the sublimation temperature ($T_{SUB}$), the third predetermined time duration, the state of the valves are constantly observed. In many embodiments of the present invention, all sensors are network-based devices. Step 607 can be implemented by, controller unit 201, database 202, sensors such as 215, 216, 219, 225M, 229, 252, 262M, 263, 264, etc. that are connected to a network such as the industrial wireless sensor network (IWSN).

Next at step 808, a primary convection current vacuum free drying (pri CCVFD) operational step is performed. In the primary convection current vacuum drying operational step, the controller unit brings the ice condenser unit well below the triple point (sublimation) temperature of the probiotic species for a third predetermined time duration. Please see Table 1. As an example, when probiotic spp are selected, the sublimation temperature ($T_{SUB}$) is maintained at −20° C. for 11 hours. A vacuum pipe 223 connecting the ice condenser unit 220 and the vacuum pump unit 250 is turned off so that the cold vapors from the ice condenser unit 220 are prevented from entering the vacuum pump unit 250. It will be noted that the eutectic temperatures ($T_{eu}$) of the probiotic extracts are taken into consideration by the controller unit to avoid eutectic melt down of the probiotic extracts. Step 808 can be implemented by controller unit 201, database 202, vacuum freeze dried chamber 210, ice condenser unit 220, refrigerator unit 230 of apparatus 200 described above in FIG. 2.

In the implementations of steps 805-808, the temperatures on convection current heat exchanging tubes with fins 226F are lowered and maintained at −20° C. The pressure inside ice condenser unit 220 is lowered to less than 5 Torricelli (torr.). This temperature and pressure are checked at a predetermined time duration of 10 minutes interval. Current intensities of current transformer transmitter 252 are reported. Tray temperatures from tray temperature transmitters 215 and 216 are also observed.

If the process proceeds normally, at −20° C. and 5 Torr., the water in frozen probiotic extract blocks in trays 211 will be frozen solid for about an hour. Then, valve 212V is turned on to circulate hot water to pipes (not shown) underneath trays 211 in order to bring the tray temperature to 5° C. for 11 hours. This time duration is specific to the probiotic extracts. See Table 2. Controller unit 201 searches database 202 to select the correct this time duration for the probiotic extracts. During this time duration, all frozen water will be transformed directly to gaseous phase without becoming liquid first.

At step 809, the settings of the primary CCVFD are sensed by the sensors. Similar to step 808, the sublimation temperature, the third predetermined time duration, and the state of the valves are constantly observed. In many embodiments of the present invention, step 809 can be implemented by controller unit 201, database 202, and sensors such as 215, 216, 219, 225M, 229, 252, 262M, 263, 264, etc.

At step 810, if any of the settings is not correct, the controller unit or any devices that are connected to the network can alarm and adjust the settings so that the optimal primary CCVFD results can be achieved. In many embodiments of the present invention, step 810 can be implemented by controller unit 201, database 202, and sensors such as 215, 216, 219, 225M, 229, 252, 262M, 263, 264, etc.

At step 811, after correcting the settings of the primary CCVFD, the controller unit goes to the secondary convection current vacuum freeze-drying (sec CCVFD) step. A time-out may be imposed on the system until all incorrect settings are adjusted. In many embodiments of the present invention, step 811 can be implemented by controller unit 201.

At step 812, secondary convection current vacuum freeze drying (sec CCVFD) step is performed. In this step, the pressure is lowered to the triple point (sublimation) and a fourth time duration is set. In the case of the probiotic extracts being freeze dried this fourth time period is 10 minutes. Then the tray temperatures are increased by 5° C. step by a fifth time duration of about 30 minutes. Finally, tray temperatures are held at 5° C. for a sixth predetermined time duration of about 8 hours so that all remaining frozen solutes in the probiotic extracts change directly into vapor phases without becoming liquid. In step 812, the heater unit is turned on and all the valves connecting the dryer unit and the heater unit are opened. Step 812 can be implemented by controller unit 201, database 202, vacuum freeze dried chamber 210, ice condenser unit 220, refrigerator unit 230, cooling tower unit 240, vacuum pump unit 250, and water heater unit 260 of apparatus 200 described above in FIG. 2.

At step 813, the settings of the secondary CCVFD are sensed by the sensors. Similar to step 812, the sublimation temperatures ($T_{SUB}$), pressures, tray temperatures, and the predetermined time durations are constantly observed. In many embodiments of the present invention, step 813 can be implemented by controller unit 201, database 202, and sensors such as 215, 216, 219, 225M, 229, 252, 262M, 263, 264, etc.

To summarize steps 810-813, operation step (sec CCVFD) is very similar to the pri CCVFD steps 804-809 except that the temperatures inside dryer chamber unit 210 are increased to about 65° C. by turning on the circulation of hot water from water heater unit 260. Trays 211 are heated up by the vapors from the probiotic extracts during the convection current vacuum freeze drying process. The sec CCVFD step aims is to vaporize the remaining water from the probiotic extracts.

Now referring to step 814, a post convection current vacuum freeze drying (post CCVFD) operational step is performed. In this step, the refrigerator unit, the vacuum pump unit, and the cooling tower unit are turned off in that specific order for a seventh predetermined time duration prior to the release of the vacuum unit valve to avoid damaging the dried probiotic extracts. In many aspects of the present invention, step 814 can be implemented by controller unit 201, database 202, vacuum freeze dried chamber 210, ice condenser unit 220, refrigerator unit 230, cooling tower unit 240, vacuum pump unit 250, and water heater unit 260 of apparatus 200 described above in FIG. 2.

At step 815, the settings of the post CCVFD are sensed by the sensors. Similar to step 812, the temperatures, flow meters, pressures, and the predetermined time durations are constantly observed. In many embodiments of the present invention, step 815 can be implemented by controller unit 201, database 202, and sensors such as 215, 216, 219, 225M, 229, 252, 262M, 263, 264, etc.

At step 816, if any of the settings is not correct, the controller unit or any devices that are connected to the network can alarm and adjust the settings so that the optimal post CCVFD results can be achieved. After correcting the settings of the post CCVFD, the controller unit continues step 814. A time-out may be imposed on the system until all incorrect settings are adjusted. In many embodiments of the present invention, step 816 can be implemented by controller unit 201, database 202, and sensors such as 215, 216, 219, 225M, 229, 252, 262M, 263, 264, etc.

Post convection current vacuum freeze drying (post CCVFD) steps 814-816 are performed in apparatus 200. First, vacuum isolating valve 223V is turned off to prevent oils of vacuum pump unit 250 from entering ice condenser unit 220. Compressors 231 and cooling water pump 235P are switched off. Then freeze dried chamber-heater hot water valve 212V and freeze dried chamber heater hot water pump 212P are turned off. Cooling water pump 243P is turned off. At this moment, water heater unit 260 ceases to provide heat energy to dryer chamber unit 210. Thirty seconds (30 seconds) from the time vacuum isolating valve 223V is completely turned off, vacuum pump unit 250 is turned off. Cooling water valve 343V is turned off and cooling water pump 243 is locked. Then fans in cooling tower unit 240 are turned off. Vacuum release valve 228 is opened to bring the pressure inside ice condenser unit 220 to the atmospheric pressure (1 atm). A one-minute time-out is given to apparatus 200 before discharge water valve 214V is opened. Front door switch 217 and rear door switch 218 are released. Vacuum freeze probiotic extract powder can now be collected and packaged. Now, controller unit 201 can calculate the amount of water extracted from the probiotic extracts by subtracting the amount of water recorded on flow meter 225M from that on flow meter 262M.

In some implementations, method 800 may include step 817, an ice defrosting (ID) operational step is performed. In this step, water vapors from the probiotic extracts after sublimation are forwarded to the heater unit to use the latent heat to defrost the ice crystals formed on the fins of the heat exchange tubes.

At step 818, the settings of the ID are sensed by the sensors. Similar to step 817, the temperatures of the heater unit are sensed. In many aspects of the present invention, step 818 can be implemented by controller unit 201, database 202, vacuum freeze dried chamber 210, ice condenser unit 220, refrigerator unit 230, cooling tower unit 240, vacuum pump unit 250, and water heater unit 260 of apparatus 200 described above in FIG. 2.

At step 819, if any of the settings is not correct, a controller unit or any devices that are connected to the network can alarm and adjust the settings so that the optimal defrosting results can be achieved. In many embodiments of the present invention, step 619 can be implemented by controller unit 201, database 202, and sensors such as 215, 216, 219, 225M, 229, 252, 262M, 263, 264, etc.

At step 820, after correcting the settings of the ID, the controller unit continues step 818. A time-out may be imposed on the system until any of the incorrect settings are adjusted and all the ice is cleared. In many embodiments of the present invention, step 820 can be implemented by controller unit 201.

Still referring to FIG. 8, next ice defrosting (ID) steps 818-820 are performed in apparatus 200. First, the water level of heater unit 260 is measured by high water level sensor 264 and low water level sensor 265. If the water level is low, water can be refilled via feed water pipe 262 and feed water valve 262V. Three-phase heating elements 261 of water heater unit 260 are turned on to defrost all the ice in ice condenser unit 220. The temperature or amount of heat to defrost depends on the amount of the ice formed inside ice condenser unit 220. In some situations, this temperature can reach 90° C. After the ice defrosting operation is complete, three-phase heating elements 261 are turned off. Ice condenser heater hot water pump 224P is turned off. The efficiency of the convection current vacuum freeze drying process can be calculated by subtracting the amount of input water provided to water heater unit 260 measured on flow meter 262M from the amount of output water measured on flow meter 225M.

Finally at step 821, the entire convection current vacuum freeze drying process 800 ends.

Implementations of process 800 disclosed above achieve the following objectives:

A precise step-by-step procedure including predetermined time durations, temperatures, pressure, flow rate, cooling rates are constantly observed and adjusted to that optimal vacuum freeze drying process can be achieved for specific probiotic sp.

A fully automatic control with minimal human involvement so that errors can be avoided, viable novel probiotic sp can be guaranteed, and efficiency can be achieved.

High cooling rate is achieved due to the use of the natural convection currents of the present invention.

Aspects of the present invention are described above with reference to flowchart illustrations and/or block diagrams of methods, apparatus (systems) and computer program the probiotic extracts according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a apparatus, such that the instructions, which execute via the processor of the computer or other programmable data processing apparatus, create means for implementing the functions/acts specified in the flowchart and/or block diagram block or blocks.

Computer program code for carrying out operations for aspects of the present invention such as process 600 and 800 may be written in any combination of one or more programming languages, including an object oriented programming language such as Python, Java, Smalltalk, C++, Ladder logic, FBD, ST, IL, SFC, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

REFERENCES

1. Metchnikoff, E. *The Prolongation of Life*; G. P. Putnams's Sons: New York, NY, USA, 1907.
2. Marques, T. M.; Cryan, J. F.; Shanahan, F.; Fitzgerald, G. F.; Ross, R. P.; Dinan, T. G.; Stanton, C. Gut microbiota modulation and implications for host health: Dietary strategies to influence the gut-brain axis. Innov. Food Sci. Emerg. Technol. 2014, 22, 239-247.
3. Rasic, J. L. *Microflora of the intestine: Probiotics*. In Encyclopedia of Food Sciences and Nutrition; Caballero, B., Trugo, L., Finglas, P., Eds.; Academic Press: Oxford, UK, 2003; pp. 3911-3916.
4. Kim, H. J.; Roque, M. I. V., Camilleri, M.; Stephens, D.; Burton, D. D.; Baxter, K.; Thomforde, G.; Zinsmeister, A. R. *A randomized controlled trial of a probiotic combination VSL #3 and placebo in irritable bowel syndrome with bloating*. Neurogastroenterol. Motil. 2005, 17, 687-696. [PubMed]

5. Hickson, M.; Souza, A. L. D.; Muthu, N.; Rogers, T. R.; Want, S.; Rajkumar, C.; Bulpitt, C. J. *Use of probiotic Lactobacillus preparation to prevent diarrhoea associated with antibiotics: Randomised double blind placebo controlled trial.* BMJ 2007, 335, 80. [CrossRef] [PubMed]
6. Cabré, E.; Gassull, M. A. *Probiotics for preventing relapse or recurrence in Crohn's disease involving the ileum: Are there reasons for failure?* J. Crohns Colitis 2007, 1, 47-52. [CrossRef] [PubMed] Fermentation 2017, 3, 67 12 of 17
7. Quigley, E. M. M. *Gut microbiota and the role of probiotics in therapy.* Curr. Opin. Pharmacol. 2011, 11, 593-603. [CrossRef] [PubMed]
8. Zhu, Y.; Luo, T. M., Jobin, C.; Young, H. A. *Gut microbiota and probiotics in colon tumorigenesis.* Cancer Lett. 2011, 309, 119-127. [CrossRef] [PubMed]
9. Liu, C. F.; Pan, T. M. *In Vitro Effects of Lactic acid bacteria on cancer cell viability and antioxidant activity.* J. Food Drug Anal. 2010, 18, 77-86.
10. Liu, C. T., Chu, F. J.; Chou, C. C.; Yu, R. C. *Antiproliferative and anticytotoxic effects of cell fractions and exopolysaccharides from Lactobacillus casei 01.* Mutat. Res. 2011, 721, 157-162. [CrossRef] [PubMed]
11. Santivarangkna C, Kulozik U, Foerst P. *Inactivation mechanisms of lactic acid starter cultures preserved by drying processes.* J Appl Microbiol. 2008; 105(1):1-3.
12. Gomes, A. M. P. and Malcata, F. X. 1999. *Bifidobacterium spp. and Lactobacillus acidophilus: Biological, biochemical, technological and therapeutical properties relevant for use as probiotics.* Trends in Food Science and Technology, 10:139-157.
13. Mital, B. K. and Garg, S. K. 1992. *Acidophilus milk products: Manufacture and therapeutics.* Food Reviews International, 8:347-389.
14. Saxelin, M., Grenov, B., Svensson, U., Fond'en, R., Reniero, R., and Mattila-Sandholm, T. 1999. *The technology of probiotics.* Trends in Food Science and Technology, 10:387-392.
15. Richardson, D. 1996. *Probiotics and product innovation.* Nutrition and Food Science, 4:27-33
16. Siuta-Cruce, P. and Goulet, J. 2001. *Improving probiotic survival rates.* Food Technology, 55(10):36-42

DESCRIPTION OF NUMERALS 100 system for preparing probiotic bulk at industrial scale
103 mechanical connectors between units of the system 100
104 flow path without fermentator
110 fermentation unit
120 centrifermixer
130 pre-freezing individual quick freezer (IQF)
200 an exemplary convection vacuum freeze drying apparatus
201 controller unit of the exemplary CCVFD
202 database of the exemplary CCVFD
203 mechanical connectors between units of the CCVFD
204 communication channels of the exemplary CCVFD
210 dryer chamber unit
211 freeze Dried Trays (trays)
212 hot water pipe
212V freeze dried chamber-heater hot water valve
212P freeze dried chamber-heater hot water pump
213 return water pipe
214 discharge water pipe
214V discharge water valve
215 first tray temperature transmitter
216 second tray temperature transmitter
217 front door switch
218 rear door switch
219 vacuum pressure transmitter
220 convection current condensing unit (Condenser)
221 large ice condenser, freeze dried chamber connection pipe
222a liquid refrigerant pipe
222b gaseous refrigerant pipe
223 vacuum pipe
223V vacuum isolating valve
224 ice condenser heater hot water pipe
224V ice condenser heater hot water valve
224P ice condenser heater hot water pump
225 ice condenser discharge valve
225M ice condenser discharge flow meter
225V ice condenser discharge valve
226 convection current heat exchanging tubes without fins
226F convection current heat exchanging tubes with fins
227 expansion capillary tubes
228 vacuum release valve
229 ice condenser temperature transmitter
230 refrigerator unit
231 compressor
232 refrigerant container
233 liquid refrigerant heat exchanger
234 refrigerant heat exchanger
235 cooling water pipe
235P cooling water pump
240 cooling tower unit
241 feed water pipe
241V feed water valve
242 hot water returning pipe
243 cooling water pipe for vacuum pump unit
243P cooling water pump for vacuum pump unit
243V cooling water valve for vacuum pump unit
250 vacuum pump unit
251 vacuum input pipe
252 current transformer transmitter of the vacuum pump unit
260 water heater unit (heater)
261 three-phase heating element
262 feed water pipe for heater
262M feed water flow meter for heater
262V feed water valve for heater
263 heater temperature transmitter
264 high water level sensor
265 low water level sensor
300 internal structure of convection current ice condenser unit
301 rectangular base
310 input reinforcement plate for top array
311 first elongate heat exchange tube with fins
312 curved connecting tubes for top array
320 input reinforcement plate for bottom array
321 second elongate heat exchange tube without fins
322a cold gas input from the refrigerator unit
322b warm liquid output
323 curved connecting tube for bottom array
326 bottom array of second elongate heat exchange tubes
326F top array of first elongate heat exchange tubes
400 centrifermixer
401 gearbox guard
402 upper casing
403 upper belt guard
404 lower casing 405 centrifuge frame
406 subframe
410 conveyor assembly
411 total input feed tube
411A first input feed tube
411B second input feed tube
412 front main bearing assembly
413 beach section
414 bowl assembly
415 impeller adjustment assembly
416 rear main bearing assembly
417 gear box assembly
418 torque arm
421 main drive assembly
422 food coupling
423 lower belt guard
424 drive belt
431 torque control
432 liquid discharge
442 lift motor
500 rotating assembly (screw press)
501 bowl assembly
502 feedtube (vacuum or low pressure section)
503 discharge ports
504 separation zone
505 flights (vanes, or blades)
506 liquid discharge weirs
507 solid discharge weirs
508 solid cake discharge apertures
509 impeller adjustment assembly
510 casings
511 main input feed
511A first input feed
511B second input feed
511C first input valve
511D second input valve
512 solid zone
513 solid output end
514 liquid zone
515 liquid output end
531 rotation direction
532 suction force
533 horizontal rotational axis for centrifuging operation
534 inclined rotational axis for mixing operation
542 hydraulic lift motor

What is claimed is:

1. A system for incorporating probiotics into a food matrix, comprising:
a multi-purposed apparatus configured to operate as a centrifugal apparatus, a mixer, and an anaerobic fermenter;
a convection current vacuum freeze drying apparatus comprising:
a dryer chamber unit comprising a plurality of trays for depositing probiotic extract blocks to be freeze dried;
a convection current condenser unit, mechanically connected to said dryer chamber unit, comprising a plurality of first elongate heat exchange tubes, each of said plurality of first elongate heat exchange tubes having fins arranged around an outer circumference of each of said plurality of first elongate heat exchange tubes, wherein said plurality of first elongate heat exchange tubes substantially fill an internal volume of said convection current condenser unit;
a refrigerator unit mechanically connected to said convection current condenser unit, operable to provide a cold refrigerant gas to said plurality of first elongate heat exchange tubes;
a cooling tower unit mechanically connected to said convection current condenser unit;
a primary vacuum pump unit, mechanically connected to said convection current condenser unit and said cooling tower unit, operable to provide a vacuum pressure to said convection current condenser unit; and
a heater unit mechanically connected to provide a heat energy to both said dryer chamber unit and said convection current condenser unit;
a controller unit; and
a database electrically coupled to communicate with said controller unit, wherein said controller unit is electrically coupled to control and receive sensed operational settings from said dryer chamber unit, said convection current condenser unit, said refrigerator unit, said cooling tower unit, said primary vacuum pump unit, and said heater unit, wherein said database is configured to store predetermined operational settings and wherein said controller unit is operable to compare said sensed operational settings and said predetermined operational settings.

2. The system of claim 1 wherein said multi-purposed apparatus further comprises:
a plurality of input terminals;
a bowl assembly having flights and in food communication with said plurality of input terminals;
an output terminal configured to receive said food matrix from said bowl assembly by a rotational force when said bowl assembly is rotated;
a gear assembly operable to rotate said bowl assembly;
a lift motor operable to lift one end of said bowl assembly so that said bowl assembly is inclined at an angle $\Theta$; and
a pair of input weirs in communication with said plurality of input terminal and a pair of said output weirs in communication with said output terminal.

3. The system of claim 1 wherein said bowl assembly further comprises:
a hollow body having a first section with a first diameter; wherein said first section is connected to a second section having a second diameter greater than said first diameter;
a beach section connected between said first section and said second section, wherein said first section is connected to said plurality of input terminals and said pair of input weirs; and wherein said second section is connected to said pair of output weirs and said output terminal.

4. The system of claim 1 wherein said plurality of first elongate heat exchange tubes forms a three-dimensional N×M×L array of first elongate heat exchange tubes, where N is a number of said plurality of first elongate heat exchange tubes arranged in a column along a first direction and M is a number of said plurality of first elongate heat exchange tubes arranged in a row along a second direction, and each of said plurality of first elongate heat exchange tubes has a length L extended in a third direction, wherein said L, M, and N are non-zero integers.

5. The system of claim 4 wherein each of said column N of said three-dimensional N×M×L array further comprises vertical zig-zag heat exchange tubes forming M rows of said plurality of first elongate heat exchange tubes.

6. The system of claim 5 wherein each of said vertical zig-zag heat exchange tubes are arranged in a horizontally staggered manner and strung together by a first curved connecting tube which alternatively connect two proximate ends and two distal ends of two adjacent said plurality of first elongate heat exchange tubes so that said vertical zig-zag elongate tubes are configured to receive a cold refrigerant gas from said refrigerator unit via said vertical zig-zag tubes located at said $M^{th}$ row of said N×M×L array and to output a warm refrigerant liquid back to said refrigerator unit via said vertical zig-zag tubes located at said $M^{th}$ row of said N×M×L array.

7. The system of claim 6 wherein said convection current condenser unit further comprises a three-dimensional M×N×L array of a plurality of second elongate tubes without fins, wherein said three-dimensional M×N×L array of said plurality of first elongate tubes is laid directly on top of said M×N×L array of said plurality of second elongate tubes without fins.

8. The system of claim 7 wherein each column of said three-dimensional N×M×L array of a plurality of second elongate tubes without fins is arranged in a horizontally staggered manner and connected together by second curved connecting tubes which alternatively connect two consecutive front ends and two consecutive rear ends of said plurality of second elongate heat exchange tubes without fins so as to form second vertical zig-zag elongate tubes; wherein said second vertical zig-zag elongate tubes are configured to receive a cold refrigerant gas from said refrigerator unit from said $M^{th}$ row and output a warm refrigerant liquid back to said refrigerator unit at the first row of said N×M×L array; wherein said M columns equal to 8 and said N rows equal to 12.

9. The system of claim 8 wherein each of said plurality of first elongate heat exchange tubes further comprises a cylindrical tube and five rectangular fins arranged around an outer circumference of said cylindrical tube, wherein one of said five rectangular fins is located on top of said cylindrical tube and four rectangular fins are arranged on lateral sides of said cylindrical tube pointing downward so as to prevent ice and water from being collected on said cylindrical tube which is made of an aluminum alloy and has a circumference of 89.9 mm, a radius of 35 mm and a thickness of 3.4 mm and wherein said rectangular fin has a width of 30 mm and a length of 30 mm and a thickness of 4 mm.

* * * * *